US007500021B2

(12) United States Patent
Takahashi

(10) Patent No.: US 7,500,021 B2
(45) Date of Patent: Mar. 3, 2009

(54) OPERATION MODE CONTROL CIRCUIT, MICROCOMPUTER INCLUDING THE SAME, AND CONTROL SYSTEM USING THE MICROCOMPUTER

(75) Inventor: Hitoshi Takahashi, Fuchu (JP)

(73) Assignee: Fujitsu Microelectronics, Tokyo (JP)

( * ) Notice: Subject to any disclaimer, the term of this patent is extended or adjusted under 35 U.S.C. 154(b) by 542 days.

(21) Appl. No.: 10/849,958

(22) Filed: May 21, 2004

(65) Prior Publication Data

US 2005/0038924 A1 Feb. 17, 2005

(30) Foreign Application Priority Data

Jul. 31, 2003 (JP) ............................. 2003-204301
Jan. 26, 2004 (JP) ............................. 2004-017705

(51) Int. Cl.
*G06F 3/00* (2006.01)
(52) U.S. Cl. .................. 710/5; 700/79; 713/1; 713/100
(58) Field of Classification Search .................. 710/5; 713/1, 100; 700/79
See application file for complete search history.

(56) References Cited

U.S. PATENT DOCUMENTS

| 4,072,852 | A | * | 2/1978 | Hogan et al. ................... 714/15 |
| 4,228,502 | A | * | 10/1980 | Wakasugi ....................... 713/1 |
| 4,580,246 | A | * | 4/1986 | Sibigtroth ................... 365/195 |
| 4,670,676 | A | * | 6/1987 | Nishitani ..................... 327/143 |
| 4,807,141 | A | * | 2/1989 | Muller ........................ 705/405 |
| 5,155,856 | A | * | 10/1992 | Bock et al. ..................... 713/1 |
| 5,249,227 | A | * | 9/1993 | Bergum et al. ............... 713/194 |

FOREIGN PATENT DOCUMENTS

| JP | 05-032142 | 5/1993 |
| JP | 08-063445 | 3/1996 |
| JP | 08-235073 | 9/1996 |
| JP | 10-340200 | 12/1998 |

OTHER PUBLICATIONS

Japanese Official Action rendered in the corresponding Japanese Patent Application No. JP2004-017705.

* cited by examiner

*Primary Examiner*—Henry W. H. Tsai
*Assistant Examiner*—H. N.
(74) *Attorney, Agent, or Firm*—Hanify & King, P.C.

(57) ABSTRACT

A microcomputer, resettable by a reset signal from the outside, for performing processes under the control of a control program, and includes an input and output circuit having a plurality of operation modes, a control signal generator for generating a write signal in an operation mode setting routine of the control program, a control circuit for setting an operation mode of the input and output circuit in response to the write signal, and a protection circuit for protecting the input and output circuit from being reset in operation mode until the protection circuit is reset by the reset signal from the outside once the control circuit has set the operation mode, wherein the input and output circuit receives a signal from and sends a signal to the outside in accordance with the operation mode set by the control circuit.

7 Claims, 18 Drawing Sheets

OPERATION MODE CONTROL CIRCUIT, MICROCOMPUTER INCLUDING THE SAME, AND CONTROL SYSTEM USING THE MICROCOMPUTER

CROSS-REFERENCE TO RELATED APPLICATIONS

This application is based upon and claims the benefit of priority from the prior Japanese Patent Application No.2003-204301, filed on 2003 Jul. 31, and the prior Japanese Patent Application No. 2004-017705, filed on 2004 Jan. 26, the entire contents of which are incorporated herein by reference.

BACKGROUND OF THE INVENTION

1. Field of the Invention

The present invention relates to a microcomputer including an input and output circuit having a plurality of operation modes, and performing processes under the control of a control program and, in particular, to an operation mode control circuit for controlling the operation mode of the input and output circuit, a microcomputer having the operation mode control circuit, and a control system including a the microcomputer and a watchdog timer.

2. Description of the Related Art

Microcomputer systems must reliably operate under adverse conditions with a monitoring function of a watchdog timer remaining effective. In the discussion that follows, the microcomputer refers to a typically available microcomputer, a microcomputer system, a semiconductor control apparatus such as a digital signal processor (DSP), or the like. In the system controlled by the microcomputer under the control of a control program, the microcomputer having an input and output circuit with a plurality of operation modes must reliably perform the operation mode of the input and output circuit set at the initialization of the microcomputer under the control of the control program. This is because input and output signals of the microcomputer greatly affect other devices within the microcomputer system that operate in response to the input and output signals of the microcomputer. As a result, the general operation of the microcomputer system is also affected.

There is a need for a circuit that reliably controls an operation mode once the operation mode is set in the input and output circuit contained in the microcomputer.

The conventional art relating to operation control of the input and output circuit of the microcomputer and a reliable operation of a microcomputer system employing a watchdog timer is discussed with reference to FIGS. 16 through 18.

A onboard vehicular LAN microcomputer system shown in FIG. 16 includes a microcomputer 602, a watchdog timer 605 that is an external LSI for monitoring the operation of the microcomputer 602 through a reset signal line 612 and P.RUN signal line 611, a power supply 603, an ROM 606, an input interface 601, a VCCII ON/OFF circuit 607 controlled by a sleep and wake up signal 610 from microcomputer 602, a VCCI 613, a VCCI 614, a low-voltage reset circuit 608, a communication LSI 609, a delay circuit 604, and multi-input AND gate 615.

The above onboard vehicular LAN microcomputer includes a watchdog timer (hereinafter simply referred to as a watchdog) 605 for monitoring the operation of the microcomputer 602. If the microcomputer 602 hangs for any reasons, the watchdog 605 detects an interruption of a signal from a monitoring signal generator in the microcomputer 602. The microcomputer 602 is then reset to prevent further erratic operation (Japanese Unexamined Patent Application Publication 5-32142).

A data processing apparatus shown in FIG. 17 is a single-chip microcomputer. The data processing apparatus includes a central processing unit (CPU) 701, a system controller (SYSC) 702, an interrupt controller (INT) 704, a read-only memory (ROM) 705, a random-access memory (RAM) 706, a timer 708, a serial communication interface (SCI) 707, first through eight input and output ports (IOP 1) 709 through (IOP 8) 716, a clock pulse generator (CPG) 703, internal data buses 717, and write request signals 718.

The data processing apparatus includes, in the single chip microcomputer, the SYSC 702 holding operation mode information. In an initialization process, the data processing apparatus automatically reads the information stored in the ROM 705, which is a non-volatile memory, and sets a control signal, not controlled by software, to the SYSC 702 having the operation mode information. The operation mode information stored in the SYSC 702 is not rewritten by software in the CPU 701 in operation subsequent to the initialization process. This arrangement prevents the operation mode from being erroneously rewritten. Such a system is disclosed in Japanese Unexamined Patent Application Publication No. 8-63445.

A microcomputer shown in FIG. 18 includes a CPU 801, a memory 802, internal buses 823, a protect control circuit 830 including a protect control register 804, address decoders 803, 811-814, logical elements 805-810, and a logical element 827, a clock generator circuit 819 having a control register 815, a peripheral unit A 820 having a control register 816, a peripheral unit B 821 having a control register 817, and a peripheral unit C 822 having a control register 818.

In the microcomputer, the protect control register 804 holds information as to whether to permit or inhibit data writing on the control registers 815-818 to write data therein on a per control register basis. If a write operation occurs, a control register to write is determined. The protect control circuit 830 controls a write signal based on the information of the protect control register 804. In this way, erroneous writing onto the control register due to a program malfunction is thus controlled. Such a technique is disclosed in Japanese Unexamined Patent Application Publication No. 8-235073, for example.

SUMMARY OF THE INVENTION

It is an object of the present invention to provide an operation mode control circuit, a microcomputer containing the operation mode control circuit, and a control system including the microcomputer and a watchdog timer for assuring flexibility and expandability in an operation mode of the microcomputer and controlling an unintended resetting of the operation mode.

The present invention in a first aspect relates to a microcomputer, resettable by a reset signal from outside the microcomputer, for performing processes under the control of a control program, and includes an internal circuit such as an input and output circuit having a plurality of operation modes, a control signal generator for generating a write signal in response to the control program, a control circuit for setting an operation mode of the internal circuit such as the input and output circuit in response to the write signal, and a protection circuit for protecting the input and output circuit from being reset in operation mode from the setting of the operation mode until a resetting of the operation mode in response to the reset signal, wherein the internal circuit such as the input and output circuit receives a signal from and sends a signal to outside the microcomputer in accordance with the operation mode set by the control circuit.

In accordance with the first aspect of the present invention, the above-described microcomputer sets the operation mode of the internal circuit such as the input and output circuit in accordance with the control program. After the setting of the operation mode, the write protection circuit prevents the operation mode from being reset until the resetting of the operation mode in response to the reset signal. For example, if the input and output circuit inputs or outputs a vital signal, such a vital signal faithfully reflects the status of the microcomputer.

The present invention in a second aspect relates to an operation mode control circuit arranged in a microcomputer for performing processes under the control of a control program, and includes a control signal generator, a write protection circuit for generating a buffer signal in response to a predetermined output signal from the control signal generator after an initialization of the microcomputer, and a control circuit for latching the predetermined output signal from the control signal generator in response to the buffer signal from the write protection circuit, wherein the control circuit sets an operation mode of an internal circuit such as an input and output control circuit, which receives a signal from and sends a signal to the outside, in accordance with the latched signal.

In accordance with the above-described operation mode control circuit of the second aspect of the present invention, the write protection circuit prevents the signal latched by the control circuit from being rewritten by the microcomputer itself. Regardless of the state of the microcomputer, the operation mode of the input and output control circuit that controls signal inputting from and signal outputting to outside the microcomputer is maintained.

The present invention in a third aspect relates to a control system and includes the above-described microcomputer and a watchdog timer, wherein the microcomputer connected to the input and output control circuit further includes a monitoring signal output port for outputting a monitoring signal to the watchdog timer, a reset signal input port for receiving a first reset signal from the watchdog time, and a reset circuit for generating a second reset signal to be output to a predetermined circuit of the microcomputer in response to the first reset signal from the watchdog timer.

In accordance with the above-referenced control system of the third aspect of the present invention, the monitoring signal output from the microcomputer to the watchdog timer is generated in response to the operation of the microcomputer. Whether or not the monitoring signal is interrupted reflects the status of the microcomputer. The watchdog timer thus properly monitors the microcomputer.

DESCRIPTION OF THE PREFERRED EMBODIMENTS

Figure 1:
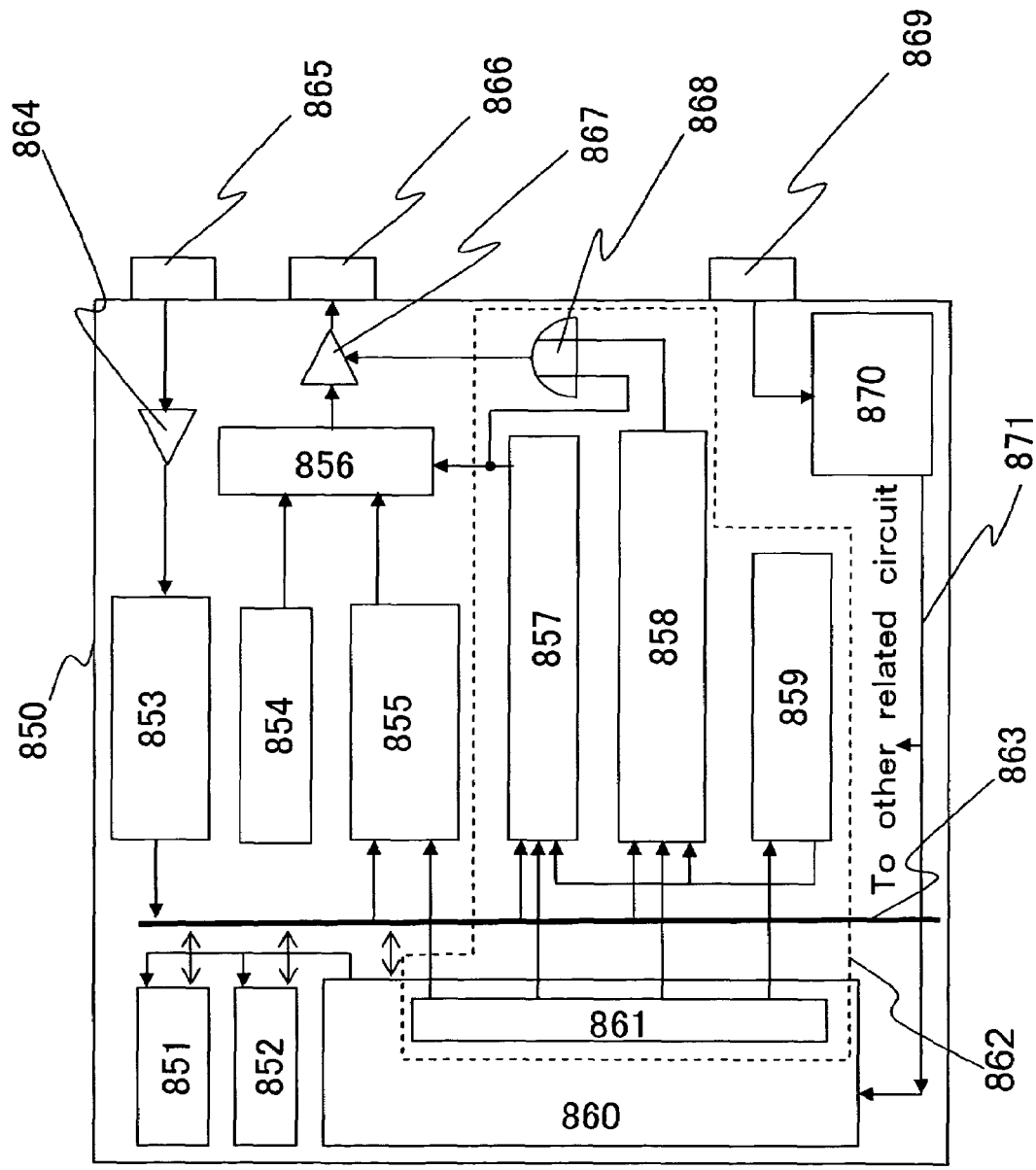
FIG. 1 is a block diagram of a microcomputer in accordance with a first preferred embodiment of the present invention.

If a microcomputer performing processes under the control of a control program and containing an input and output circuit having a plurality of modes determines an operation mode in accordance with the control program only, an unintended operation mode may be set. If the determination of the operation mode is left to the responsibility of the hardware of a computer only to prevent the setting of an unintended operation mode, the system cannot benefit from flexibility and expandability.

Conventional data processing apparatuses prevent an operation mode or the like from being overwritten in response to a command arising from the software of a CPU during an erratic operation of the microcomputer. A register holding operation mode information is controlled by a control signal a software program is unable to control. In this arrangement, the operation mode is set by only information stored in a non-volatile storage device, and flexibility and expandability are not enjoyed.

In conventional microcomputers, a protect control register for determining whether to permit or inhibit writing to an operation-mode determining control register and a protect control circuit for selecting a control register that determines the operation mode typically require large-scale hardware. Although a protect circuit prevents a control register for determining an operation mode from being rewritten due to a malfunction of a known microcomputer, a protect control register can be rewritten by a software based command. The protect control register is rewritten by a software based command during a malfunction of the microcomputer. As a result, the operation-mode determining control register is rewritten, thereby setting an unintended operation mode.

In response to a command of a control program, a microcomputer in a microcomputer system can switch an input and output attribute of an input and output circuit (such as an input mode and an output mode), and an output signal from an internal peripheral device such as an analog-to-digital converter or a 16-bit long interval timer to output to the outside. If a microcomputer malfunctions, a monitoring signal the microcomputer itself issues is interrupted. When a watchdog in the microcomputer system has detected the interruption of the monitoring signal, a watchdog outputs a reset signal, thereby preventing the microcomputer system from malfunctioning.

The output signal of an internal peripheral device output from an internal peripheral device to outside the microcomputer system may be switched in response to a command from a malfunctioning microcomputer. Instead of a monitoring signal, a timer signal similar to the monitoring signal may be output. In such a case, the watchdog is unable to detect the monitoring signal, and fails to issue a reset signal stopping the malfunction of the microcomputer.

The microcomputer system is subject to an error operation even with the monitoring function of the watchdog incorporated.

Internal noise or noise triggered from external noise in a normally operating microcomputer may cause a command for setting the operation mode even the microcomputer does not issue such command in fact. The mode of an output circuit outputting the monitoring signal to the watchdog is reset, and the monitoring signal is interrupted. Even with the microcomputer operating normally, the watchdog issues a reset signal, thereby resetting the microcomputer.

Microcomputers of the preferred embodiments of the present invention are discussed. The microcomputer here refers to a typically available microcomputer, a microcomputer system, a semiconductor control apparatus such as a digital signal processor (DSP), or the like. The microcomputer includes a central processing unit (CPU) containing a control signal generator, an output data register, an operation mode control circuit, a timer, a selector, and an input/output buffer having a plurality of operation modes. The operation mode control circuit includes an OR gate, a peripheral selection register, an input and output control register, and a write protection circuit.

The CPU controls control circuits other than the CPU itself under the control of a control program of the microcomputer. In an operation mode setting routine of the control program, the CPU generates a write signal relating to the operation mode setting of the input and output control register, a peripheral selection register, etc. to set the operation mode through the control signal generator.

The output data register temporarily stores data that is output from the CPU to outside the microcomputer through the I/O buffer.

The timer is a specific example of a peripheral function circuit, and generates a signal at regular intervals to cause the microcomputer to control an external device.

The selector selects one of an output of the output data register and an output of the timer to supply to the I/O buffer in response to the logical value of a signal from the peripheral selection register.

The operation mode control circuit controls the selector in the selection operation thereof through the peripheral selection register. The operation mode control circuit controls the operation mode of the I/O buffer through the input and output control register and the OR gate. Units forming the operation mode control circuit operate as discussed below.

In response to the write signal, the peripheral selection register outputs, to the selector and the OR gate, a signal for supplying the output of the output data register to the I/O buffer.

The input and output control register outputs, to the OR gate, a signal for setting the operation mode of the I/O buffer.

The OR gate receives the output of the peripheral selection register and the output of the input and output register. The OR gate outputs a signal having a logical value of "0" if the output of the peripheral selection register has a logical value of "0", or outputs a signal having the same logical value as the output of the input and output control register if the output of the peripheral selection register has a logical value of "1".

The write protection circuit outputs, to the selector and the OR gate, the signal having a logical value of "0" with which the peripheral selection register supplies the output of the output data register to the I/O buffer. The OR gate outputs a signal having a logical value of "0". Once the operation mode of the I/O buffer is set, the operation mode of the input and output circuit is prevented from being reset until being reset in response to an external reset signal.

The I/O buffer having the plurality of operation modes inputs a signal from and outputs a signal to outside the microcomputer in accordance with the operation mode set by the logical value of a signal from the OR gate. In this way, the operation mode corresponding to the logical value of "0" is an output mode, while the operation mode corresponding to the logical value of "1" is an input mode.

In accordance with the preferred embodiments of the present invention, the connection setting for connecting the output of the output data register to the I/O buffer and the operation mode of the I/O buffer remain settable by software during the operation mode setting routine of the control program of the CPU. However, subsequent to the end of the operation mode setting routine, the operation mode control circuit and the write protection circuit constituting the operation mode control circuit disable the operation mode of the I/O buffer and the connection of the output data register to the I/O buffer from being reset until being reset in response to an external reset signal. Even if an unintended software program is initiated as a result of a malfunction of the CPU, the above setting remains unchanged.

First Preferred Embodiment

A first preferred embodiment of the present invention is now discussed with reference to FIGS. 1 through 4.

A microcomputer 850 shown in FIG. 1 includes a central processing unit (CPU) 860 containing a control signal generator 861, a random-access memory (RAM) 851, a read-only memory (ROM) 852, an operation mode detector 853, an output data register 855, a reset circuit 870, an operation mode control circuit 862, a timer 854, a selector 856, an input buffer 864, an input/output (I/O) buffer 867, data buses 863, a reset signal 871, an operation mode setting port 865, a monitoring signal output port 866, and a reset signal receiving port 869. The operation mode control circuit 862 includes an OR gate 868, a peripheral selection register 857, an input and output control register 858, and a write protection circuit 859.

The monitoring signal output port 866 outputs a monitoring signal from the microcomputer 850 to a watchdog timer. The watchdog timer, external to the microcomputer 850, monitors the output timing of the monitoring signal, namely, intervals of the monitoring signal or the number of outputs per unit time, thereby determining whether the CPU 860 in the microcomputer 850 normally operates.

The operation mode setting port 865 receives an external input signal for determining the operation mode from outside the microcomputer 850 during a period for determining the operation mode of the microcomputer 850.

The reset signal receiving port 869 receives a reset signal the watchdog timer generates when the watchdog timer determines the CPU 860 in the microcomputer 850 erratically operates or in a state of runaway. The reset signal receiving port 869 also receives a reset signal from outside the microcomputer 850. This reset signal is input to initialize the microcomputer 850. The external reset signals thus include the "reset signal from the watchdog timer" and the "reset signal input from outside the microcomputer 850" for initialization of the microcomputer 850.

The CPU 860 generally controls the microcomputer 850 under the control of a control program of the microcomputer 850. The control signal generator 861 within the CPU 860 controls circuits in microcomputer 850 in connection with the operation mode determination for circuits other than the CPU 860 in microcomputer 850.

The RAM 851 and the ROM 852 temporarily store the control program, setting conditions, and data that are exchanged between function circuits within the microcomputer 850.

In addition, the data buses 863 serve as a group of buses through which data is exchanged between the function circuits within the microcomputer 850. The data buses 863 includes a common bus connected to the CPU 860 and a bus connected to the function circuits but unconnected to the CPU 860.

Depending on the reset signal from the watchdog timer or the reset signal from outside the microcomputer 850, the reset circuit 870 generates one of an internal reset signal 904 and the reset signal 871 for circuits internal to the microcomputer 850, thereby resetting the internal related circuits of the microcomputer 850. The reset signal 871 is supplied to the CPU 860 and other related circuits that need to be reset.

The operation mode detector 853 determines the input state of the operation mode setting port 865 subsequent to the operation of the microcomputer 850 during a period for determining the operation mode.

The I/O buffer 867 serves as an output circuit that outputs data to outside the microcomputer 850, while serving as an input circuit that receives data from outside the microcomputer 850 at the same time. The I/O buffer 867 may have a plurality of input and output modes, including an input mode, an output mode, another mode being neither the input mode nor the output mode, etc. The I/O buffer 867 has an operation mode setting terminal. In the first preferred embodiment of the present invention, the I/O buffer 867 preferably functions in the output mode in response to the input of a signal having a logical value of "0" and functions in the input mode in response to the input of a signal having a logical value of "1".

The output data register 855 temporarily stores data the CPU 860 outputs through the I/O buffer 867 to outside the microcomputer 850. The output data register 855 hands the data thereof to the I/O buffer 867 at a predetermined timing. When the I/O buffer 867 is connected to the monitoring signal output port 866 that outputs data from the microcomputer 850 to the watchdog timer, the output data register 855 temporarily stores the data from the microcomputer 850 before being sent to the watchdog timer. The predetermined timing, considered as evidence of normal operation of the CPU 860, is achieved under the control of the CPU 860.

The timer 854 is a specific example of peripheral function circuit, and generates a signal at regular intervals the microcomputer 850 uses to control external devices.

Depending on the logical value of the signal from the peripheral selection register 857, the selector 856 selects between the output of the output data register 855 and the output of the timer 854 and outputs the selected signal to the I/O buffer 867. More specifically, if the logical value of the signal from the peripheral selection register 857 is "0", the output of the output data register 855 is selected. If the logical value of the signal from the peripheral selection register 857 is "1", the output of the timer 854 is selected.

The operation mode control circuit 862 controls the input and output mode of the I/O buffer 867 and commands the selector 856 to select between the signals. The circuits constituting the operation mode control circuit 862 operate as described below.

The input and output control register 858 latches a signal for setting the input and output mode, and outputs a signal having the same logical value of the latched signal to the OR gate 868.

The peripheral selection register 857 latches a signal indicating the selection to the selector 856, and outputs a signal, identical to the latched signal, to the selector 856 and the OR gate 868.

The write protection circuit 859 prevents a signal for commanding the selector 856 from being rewritten onto the peripheral selection register 857 until being reset in response to the "reset signal from outside the microcomputer 850" or the "reset signal from the watchdog timer".

The OR gate 868 outputs a signal having a logical value of "0" when the logical value of the signal issued by the peripheral selection register 857 to command the selector 856 to select is "0", in other words, when the selector 856 selects the output signal from the output data register 855. As a result, the I/O buffer 867 is set to be the output mode.

The OR gate 868 outputs a signal having a logical value corresponding to the signal from the input and output control register 858 when the logical value of the signal issued by the peripheral selection register 857 to command the selector 856 to select is "1", in other words, when the selector 856 selects the output from the timer 854. As a result, the I/O buffer 867 is set to the input and output mode corresponding to the logical value of the signal from the input and output control register 858.

The operation mode control circuit 862 thus constructed sets the connection to the I/O buffer 867 for supplying the output signal from the output data register 855 to the I/O buffer 867 and sets the operation mode of the connected I/O buffer 867 during the operation mode setting period of the microcomputer 850. Once the operation mode control circuit 862 connects the output of the output data register 855 to the I/O buffer 867 and sets the operation mode of the I/O buffer 867 to the output mode, the write protection circuit 859 in the operation mode control circuit 862 prevents the setting from being reset until the resetting is performed in response to the "reset signal from outside the microcomputer 850" or the "reset signal from the watchdog timer".

The input buffer 864 transfers a signal input to the operation mode setting port 865 to the operation mode detector 853.

Figure 2:
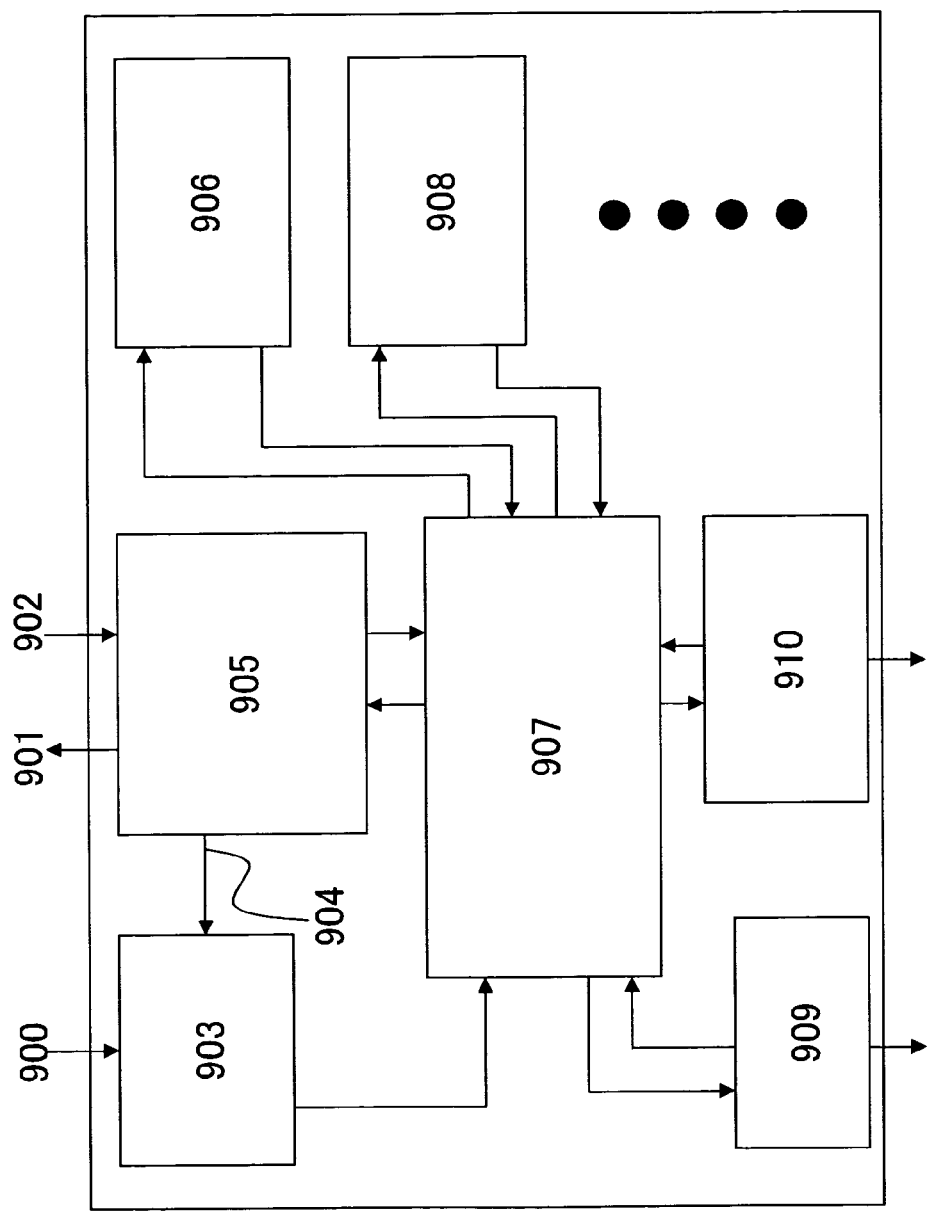
FIG. 2 is a block diagram illustrating a control program of the microcomputer of the first preferred embodiment of the present invention.

A control program of the microcomputer 850 of FIG. 2 includes, at least, an initialization module 903, a mode setting module 909, a display control module 910, a watchdog timer module 905, a task control module 907, a first peripheral functional module 906, and a second peripheral functional module 908. The control modules of the microcomputer 850 are reset in response to an "external reset signal 900 input from outside the microcomputer 850" or a "reset signal 902 from the watchdog timer". A monitoring signal 901 is generated as a result of an operation of the watchdog timer module

905. The watchdog timer module 905 generates an internal reset signal 904 to initiate the initialization module 903.

Each module of the control program corresponds to a set of routines performed by the microcomputer 850.

When the mode setting module 909 as part of the control program is in progress, the operation mode detector 853 detects a setting signal from the operation mode setting port 865, for example. The operation mode control circuit 862 under the control of the CPU 860 sets the selection of the selector 856, and the operation mode of the I/O buffer 867.

When the watchdog timer module 905 as part of the control program is in progress, the output data register 855 receives data from the CPU 860. The I/O buffer 867 outputs the output of the output data register 855 from the monitoring signal output port 866 of the microcomputer 850 as the monitoring signal 901. Upon receiving the reset signal 902 from the watchdog timer, the microcomputer 850 generates the internal reset signal 904, thereby initiating the initialization module 903.

If the CPU 860 normally operates, a predetermined signal is output at a predetermined timing as the monitoring signal 901. If predetermined signal is not output, or if the predetermined signal is not output with the predetermined timing, the CPU 860 is considered as being malfunctioning.

Figure 3:
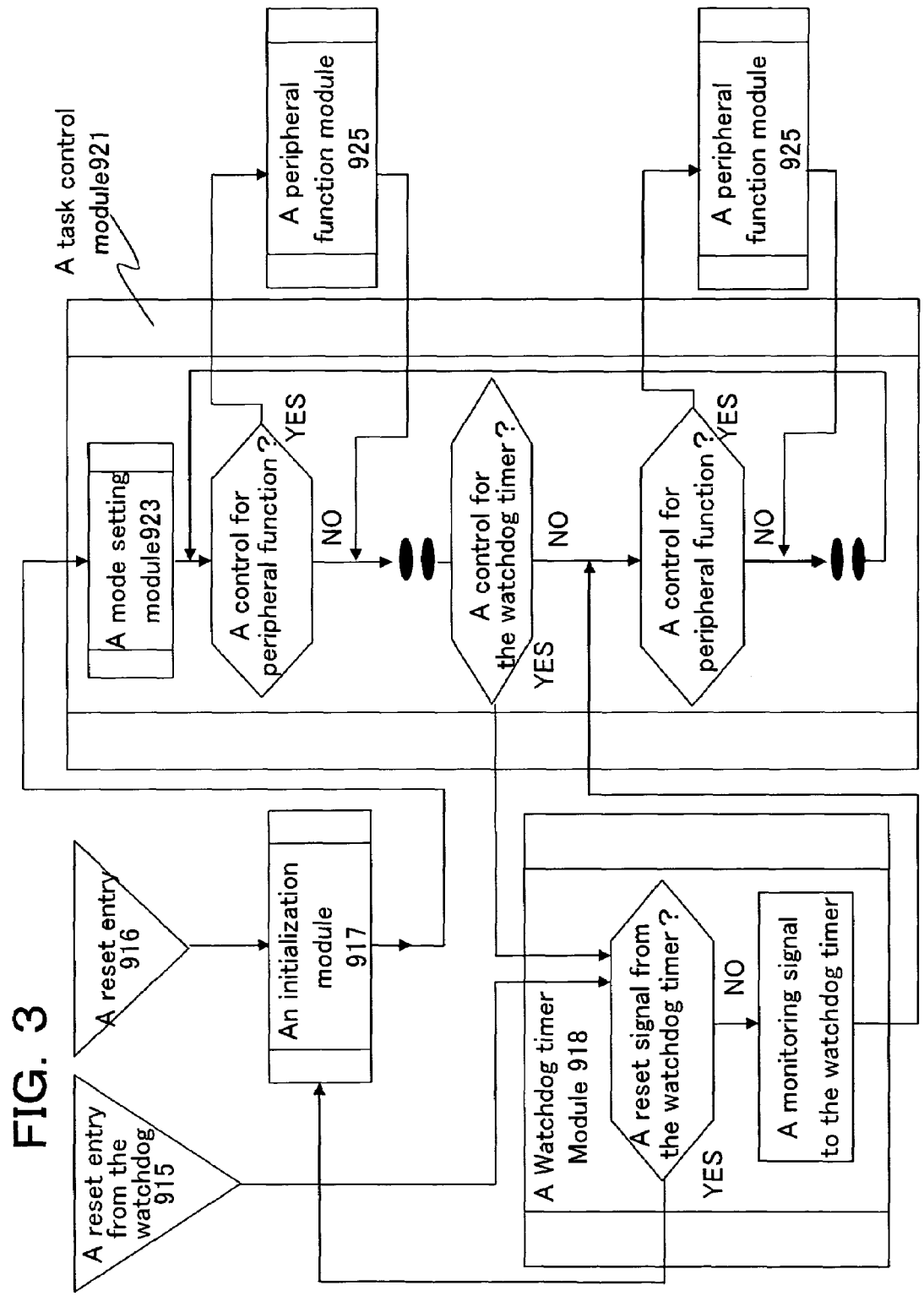
FIG. 3 is a flowchart of the control program in accordance with the first preferred embodiment of the present invention.

In the first preferred embodiment of the present invention, the reset signal receiving port 869 receives the "reset signal 902 from the watchdog timer" and the "reset signal 900 from outside the microcomputer 850". The reset circuit 870 differentiates between the "reset signal 902 from the watchdog timer" and the "reset signal 900 from outside the microcomputer 850" by referencing the features of each reset signal. The generated internal reset signal 904 and the reset signal 871 shown in FIG. 1 are supplied to related circuits including the CPU 860. It is also acceptable that the "reset signal 902 from the watchdog timer" and the "reset signal 900 from outside the microcomputer 850" are input to the microcomputer 850 through different ports. Furthermore, the "reset signal 902 from the watchdog timer" and the "reset signal 900 from outside the microcomputer 850" may be treated together rather than being separately treated. In such a case, a reset entry 915 from the watchdog timer as an entry point and a reset entry 916, in a flowchart of the control program of FIG. 3, are integrally connected to a watchdog timer module 918 shown in FIG. 3. Referring to FIG. 2, the "reset signal 902 from the watchdog timer" and the "reset signal 900 from outside the microcomputer 850" supplied to the initialization module 903 are integrated into an "external reset signal" to be input to the watchdog timer module 905 shown in FIG. 2.

When the task control module 907 as part of the control program is in progress, a predetermined algorithm determines a timing of executing each module.

In response to the input of the "reset signal 900 from outside the microcomputer 850", the initialization module 903 as part of the control program is first executed, thereby setting the microcomputer 850 to an initial state.

When the display control module 910 as part of the control program is in progress, the microcomputer 850 generates a signal for displaying, on an external display controlled by the microcomputer 850, an internal state of the microcomputer 850 or a device controlled by the microcomputer 850.

When one of the first peripheral functional module 906 and the second peripheral functional module 908, as parts of the control program, is in progress, a peripheral function circuit such as the timer 854 in the microcomputer 850 is operated.

FIG. 3 is a flowchart of the control program of the microcomputer 850. Upon receiving the "reset signal 900 from outside the microcomputer 850" with the program running normally, the control program of the microcomputer 850 performs the reset entry 916, an initialization module 917, a mode setting module 923, and then a task control module 921. While the task control module 921 is executed, a peripheral function control module 925 and a watchdog timer module 918 are executed in accordance with a predetermined algorithm. If the control program malfunctions, in other words, if the CPU 860 malfunctions, the control program fails to operate in accordance with the predetermined algorithm. For example, the watchdog timer module 918 fails to function at the predetermined timing, or does not function at all. In such a case, the watchdog timer module 918 is initiated by a reset entry 915 from the watchdog timer in response to the "reset signal 902 from the watchdog timer".

Figure 4:
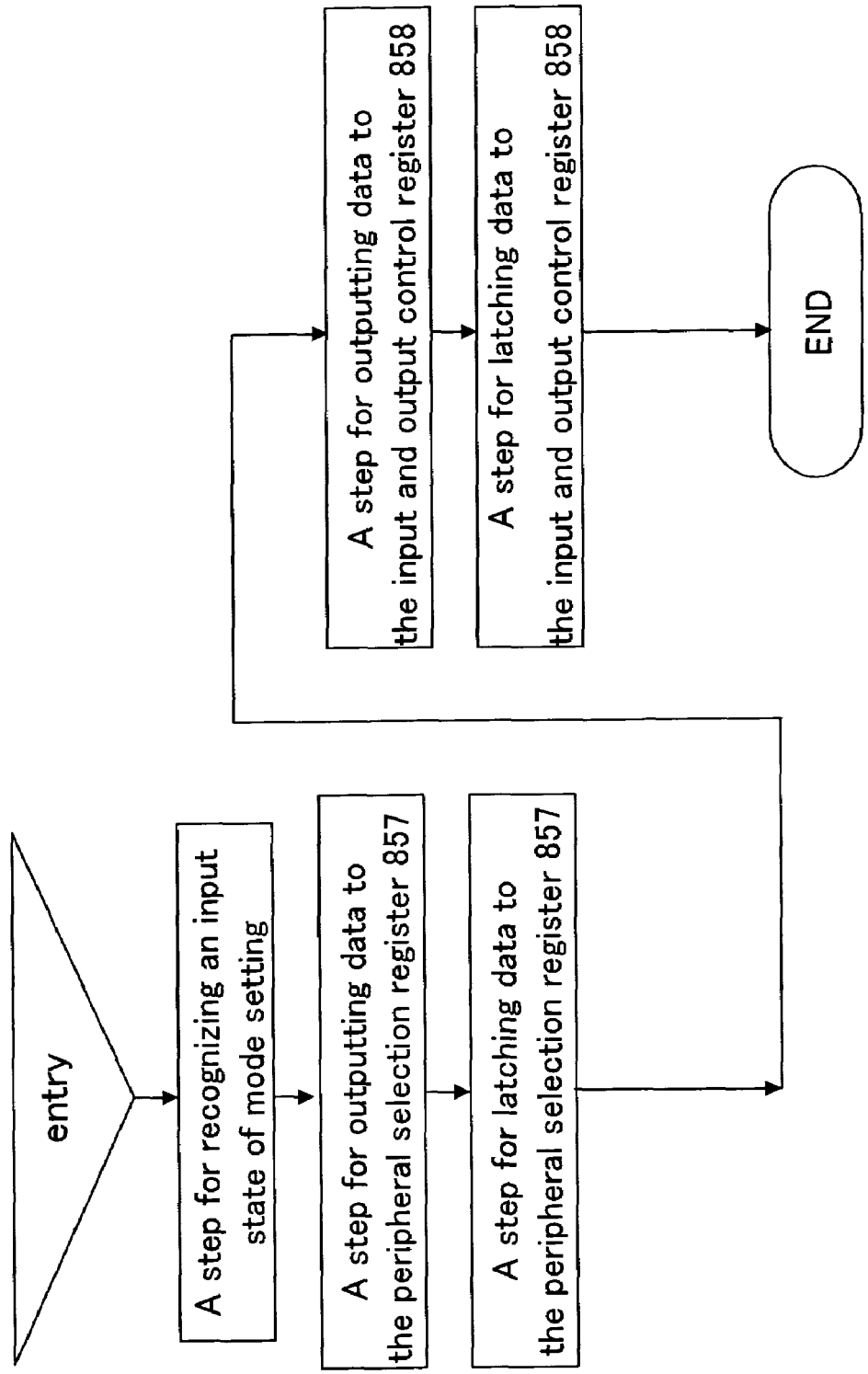
FIG. 4 is a flowchart of a mode setting routine in accordance with the first preferred embodiment of the present invention.

FIG. 4 is a flowchart of the mode setting module 923 constituting the control program of the microcomputer 850. The mode setting module 923 includes, at least, a step for recognizing an input state of mode setting, a step for outputting data to the peripheral selection register 857, a step for latching data to the peripheral selection register 857, a step for outputting data to the input and output control register 858, and a step for latching data to the input and output control register 858. After the protection of the write protection circuit 859 is released in response to the "reset signal 900 from outside the microcomputer 850" or the "reset signal 902 from the watchdog timer", the predetermined data to the peripheral selection register 857 and the input and output control register 858 is latched in response to the operation mode recognized in the step for recognizing the input state of mode setting. The operation mode of the microcomputer 850 is set, and the protection function of the write protection circuit 859 starts.

Once the operation mode of the microcomputer 850 is set in the microcomputer 850 of the first preferred embodiment, the rewriting of a signal for selecting the peripheral function to the peripheral selection register 857 is inhibited regardless of the state of the CPU 860 (even a malfunction state) until the protection is released in response to the "reset signal 900 from outside the microcomputer 850" or the "reset signal 902 from the watchdog timer". The setting of the signal for selecting the peripheral function of the peripheral selection register 857 and the setting of the operation mode of the I/O buffer 867 are not reset.

More specifically, the operation mode of the microcomputer 850 is fixed after the CPU 860 under the control of the control program sets the connection of the output data register 855 to the monitoring signal output port 866 through the I/O buffer 867 and sets the input and output mode of the output data register 855 to the output mode during the operation mode setting period of the microcomputer 850.

Even during a malfunction state of the CPU 860, the signal for commanding the selection of connection of the output of the timer 854 to the I/O buffer 867 is not latched by the peripheral selection register 857. The monitoring signal from the microcomputer 850 to the watchdog timer is not replaced with a signal from the timer 854 similar to the standard monitoring signal.

Since a signal reflecting the state of the CPU 860 is output from the monitoring signal output port 866 to outside the microcomputer 850, the watchdog timer detects a malfunction state of the CPU 860 with high reliability.

Second Preferred Embodiment

Figure 5:
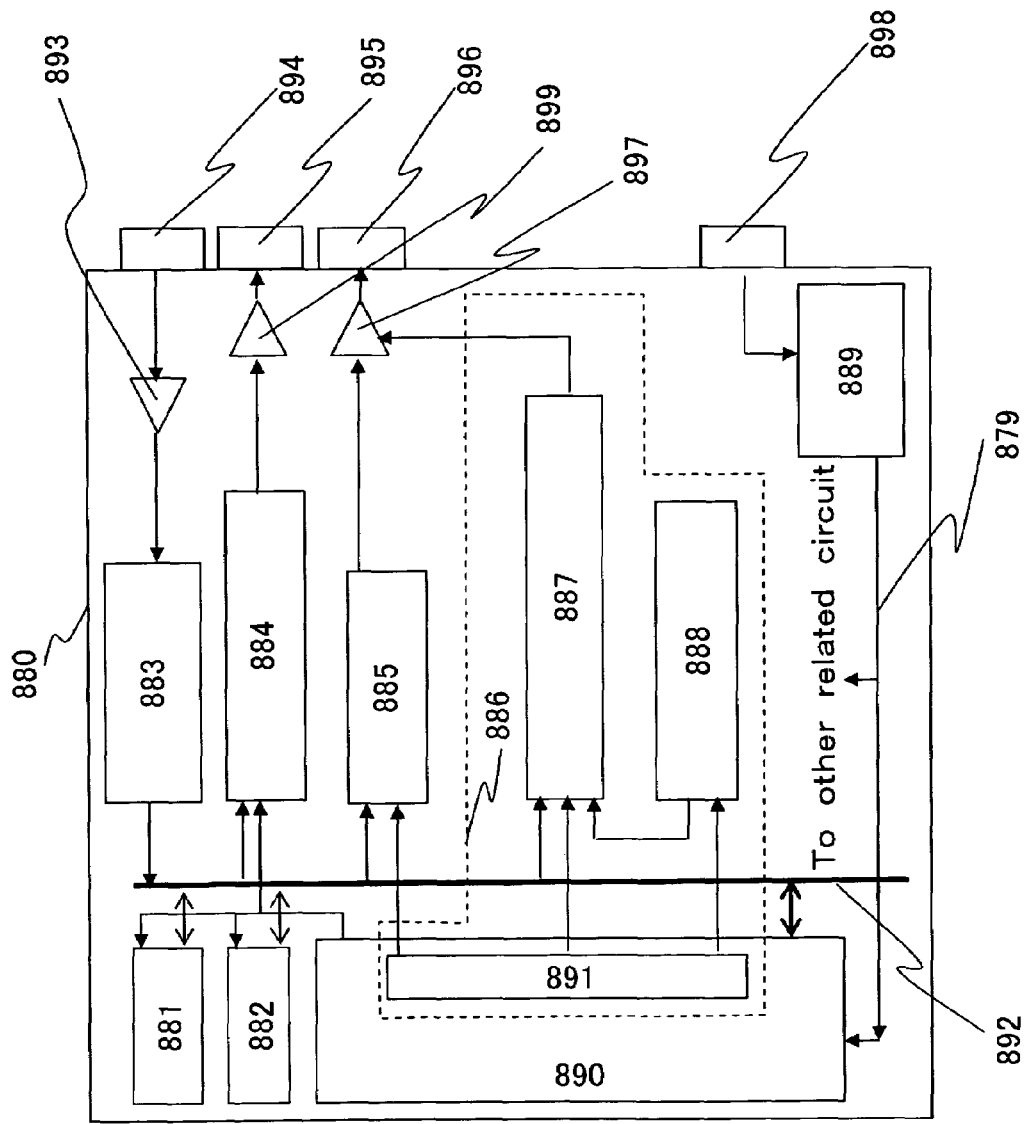
FIG. 5 is a block diagram generally illustrating a microcomputer in accordance with a second preferred embodiment of the present invention.

A microcomputer 880 shown in FIG. 5 includes a CPU 890 containing a control signal generator 891, an RAM 881, an ROM 882, an operation mode detector 883, an output data register 885, a reset circuit 889, an operation mode control circuit 886, a peripheral function circuit 884, an input buffer 893, an output buffer 899, an I/O buffer 897, a peripheral function circuit port 895, an operation mode setting circuit 894, a monitoring signal output port 896, a reset signal receiving port 898, a data bus 892, and a reset signal 879. The operation mode control circuit 886 includes an input and output control register 887 and a write protection circuit 888.

In comparison with the microcomputer 850 of the first preferred embodiment, the microcomputer 880 of the second preferred embodiment includes an ordinary peripheral function circuit 884, containing a timer 854, instead of the timer 854. Also the difference between the microcomputer 850 of the first preferred embodiment and the microcomputer 880 of the second preferred embodiment is that the output of the peripheral function circuit 884 is supplied to outside the microcomputer 880 from the peripheral function circuit port 895, that the I/O buffer 897 for the output data register 885 is separate from the output buffer 899 for the peripheral function circuit 884 with a counterpart corresponding to the selector 856 dispensed with, and that a counterpart corresponding to the peripheral selection register 857 is dispensed with as an element of the operation mode control circuit 886.

The peripheral function circuit port 895 outputs a signal from the peripheral function circuit 884 of the microcomputer 880.

The peripheral function circuit 884 generates a signal with which the microcomputer 880 controls a device external thereto, and includes an interval timer or a 16-bit analog-to-digital converter.

The operation mode control circuit 886 controls the input and output mode of the I/O buffer 897. The input and output control register 887 latches a signal for latching the input and output mode. The write protection circuit 888 protects the input and output control register 887 from the rewriting by a signal for setting the input and output mode until being reset by a "reset signal from outside the microcomputer 880" or a "reset signal from the watchdog timer". The operation mode control circuit 886 sets the operation mode of the I/O buffer 897 connected to the output data register 885 during an operation mode setting period. Once the operation mode is set in the I/O buffer 897, the operation mode control circuit 886 with the write protection circuit 888 thereof prevents the I/O buffer 897 from being reset until being reset by the "reset signal from outside the microcomputer 880" or the "reset signal from the watchdog timer".

The input buffer 893 transfers a signal from the operation mode setting circuit 894 to the operation mode detector 883.

The output buffer 899 transfers a signal from the peripheral function circuit 884 to the peripheral function circuit port 895.

Other elements of the microcomputer 880, namely, the CPU 890, the control signal generator 891, the RAM 881, the ROM 882, the operation mode detector 883, the output data register 885, the reset circuit 889, and the I/O buffer 897 are respectively identical in function to the counterparts thereof in the microcomputer 850 of the first preferred embodiment. Furthermore, the monitoring signal output port 896 and the reset signal receiving port 898 respectively play the same roles as the counterparts thereof in the microcomputer 850 of the first preferred embodiment. The data bus 892 and the reset signal 879 are also respectively identical in function to the counterparts thereof in the microcomputer 850 of the first preferred embodiment.

The control program of the microcomputer 880 controlling the CPU 890 is identical in function to the control program of the microcomputer 850 of the first preferred embodiment. A task control module, an operation mode setting module, an initialization module, a watchdog timer control module, and a peripheral function control module of the control program of the microcomputer 880 are also respectively identical in function to the counterparts thereof in the microcomputer 850 of the first preferred embodiment.

The microcomputer 880 with the operation mode control circuit 886 thereof prevents the input and output control register 887 from being written with the signal for setting the input and output mode, once the operation mode of the microcomputer 880 is set. The operation mode control circuit 886 disables the writing of the signal for setting the input and output mode onto the input and output control register 887 until the operation mode control circuit 886 is released by the reset signal from outside the microcomputer 880 or the reset signal from the watchdog timer.

More specifically, if the I/O buffer 897 is connected to the monitoring signal output port 896, the operation mode is fixed after the operation mode is set to the I/O buffer 897 during the operation mode setting period of the microcomputer 880.

The input and output control register 887 is thus prevented from an erroneous writing of the signal for setting the input and output mode even if noise occurs in the microcomputer 880 in normal operating conditions of the CPU 890. The microcomputer 880 continuously outputs the monitoring signal to the watchdog timer. As a result, the monitoring signal reflecting the operation status of the CPU 890 is fed to the watchdog timer. The watchdog timer continuously monitors the state of the CPU 890 with high reliability.

Third Preferred Embodiment

A third preferred embodiment of the present invention will now be discussed with reference to FIGS. 6 and 7. The third preferred embodiment of the present invention relates to the operation mode control circuit discussed in connection with the second preferred embodiment.

Figure 6:
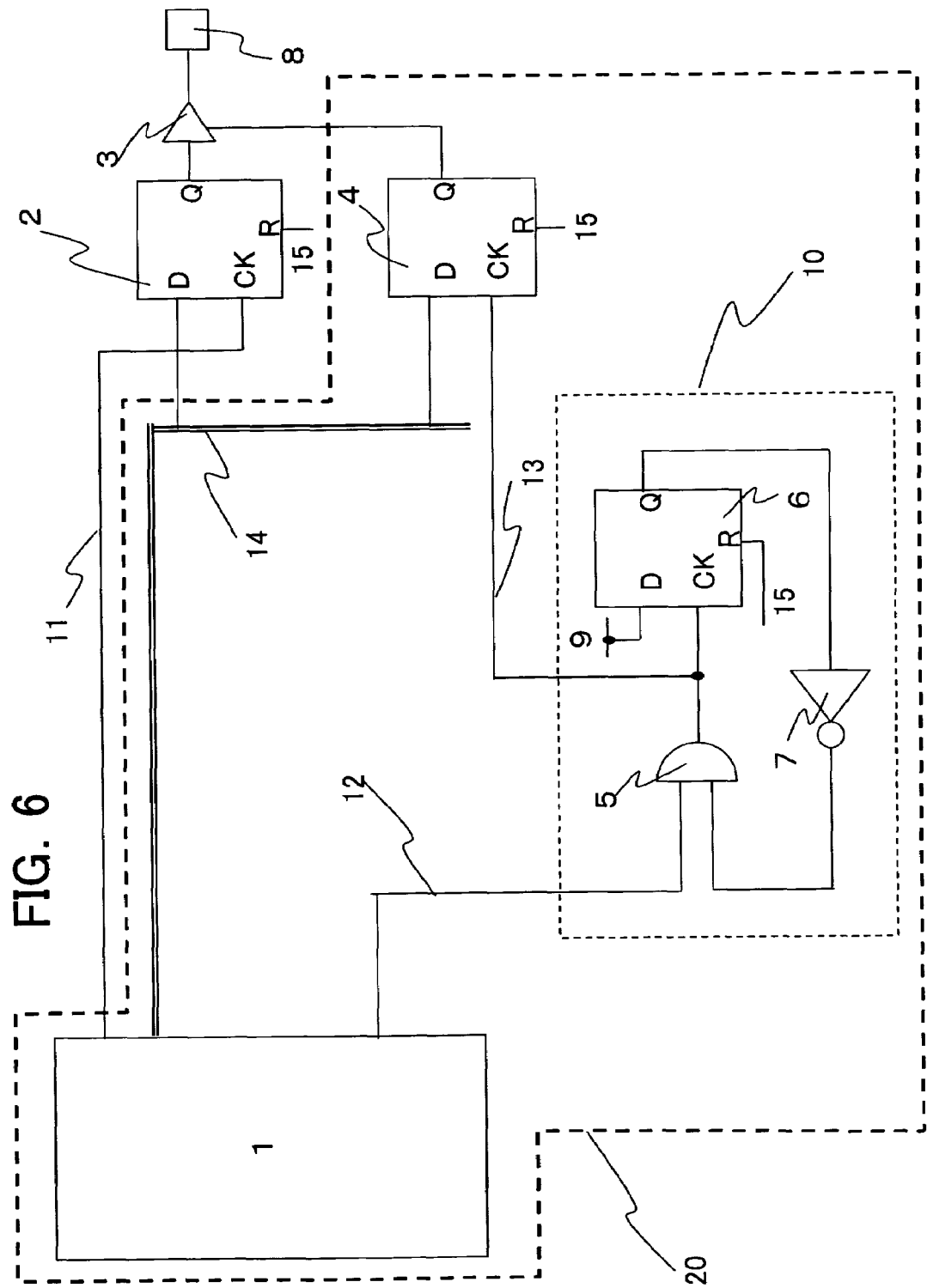
FIG. 6 illustrates a third preferred embodiment of the present invention.
Figure 7:
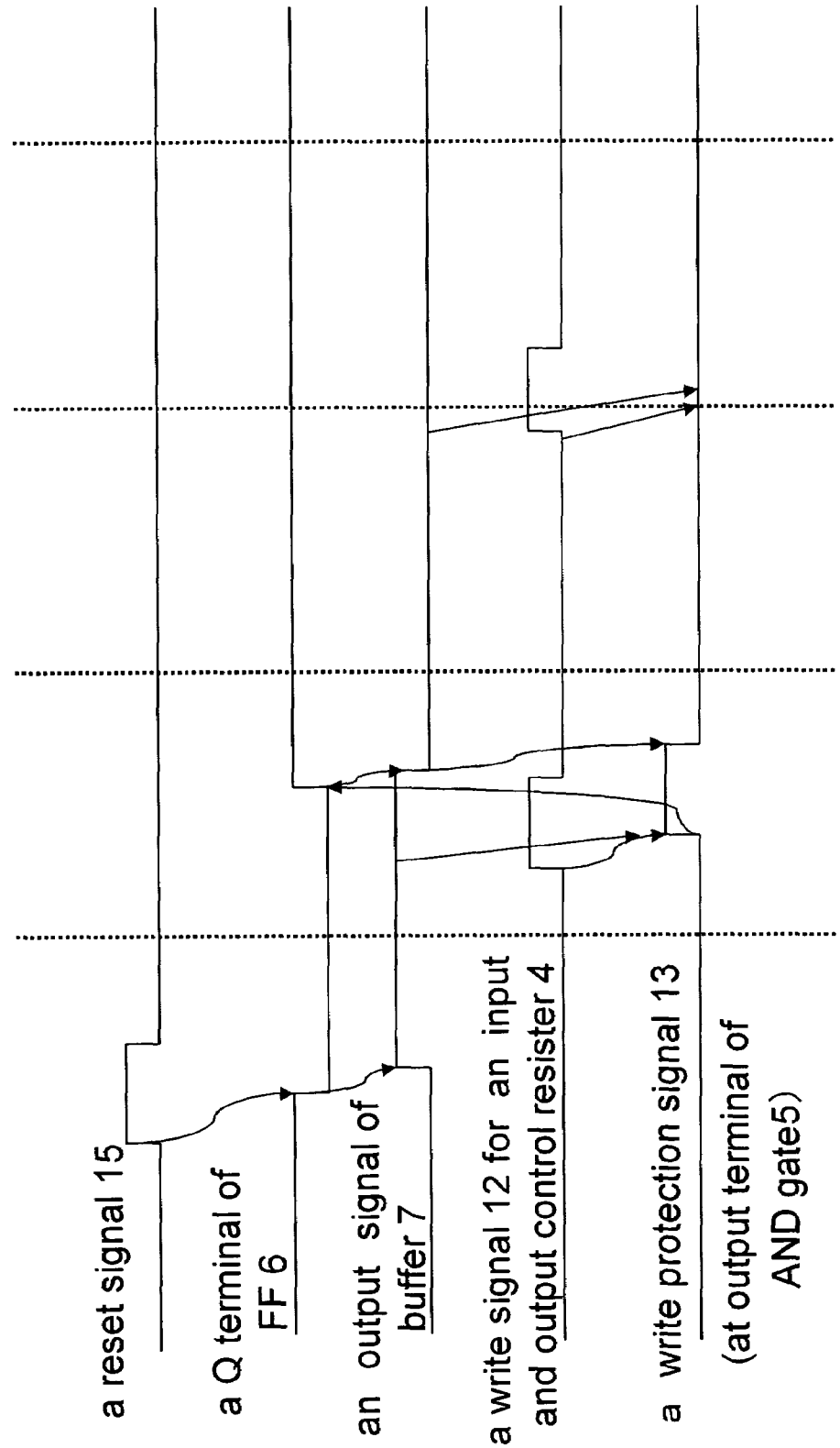
FIG. 7 is a waveform diagram of a write protection circuit in accordance with the third preferred embodiment of the present invention.

FIG. 6 shows an operation mode control circuit 20 containing a write protection circuit 10, an output data register 2 and an I/O buffer 3, both controlled by an operation mode control circuit 20, and a terminal 8 that outputs a signal from the I/O buffer 3. The I/O buffer 3 has an operation mode for outputting no signal, an operation mode for outputting a signal, etc., with the mode thereof switchable. The output data register 2 latches the data to be output from the I/O buffer 3.

The operation mode control circuit 20 includes a write pulse generator 1, a write protection circuit 10 for outputting a buffer signal that is a buffered version of an first write signal 12 for the input and output control register 4 in response to the first write signal 12 for an input and output control register 4 from the write pulse generator 1, and the input and output control register 4 for latching data from a data bus 14 in response to the buffer signal resulting from the write signal 12 for the input and output control register 4. The write pulse generator 1 supplies the output data register 2 with the output data thereof through the data bus 14, and supplies the output data register 2 with an output data register write signal 11, thereby latching the output data in the output data register 2. An output at a Q terminal of the input and output control register 4 is fed to the I/O buffer 3 to determine the operation mode of the I/O buffer 3 depending on the logical value of the output at the Q terminal.

The write protection circuit 10 includes an AND gate 5 for receiving the write signal 12 for the input and output control register 4 at one of input terminals thereof, a flip-flop (hereinafter referred to FF) 6 for receiving the output of the AND gate 5 as a data capturing signal, and a buffer 7 for outputting a signal to the other of the input terminals of the AND gate 5 in response to the output signal of the FF 6.

In response to second and subsequent input and output control register write signals 12 input to the write protection circuit 10, the write protection circuit 10 blocks the transfer of the buffered versions of the second and subsequent input and output control register write signals 12 to the input and output control register 4. The operation mode control circuit 20 thus latches a first operation mode setting value latched by the input and output control register 4 from the initialization process.

The first operation mode setting value latched by the input and output control register 4 determines the operation mode of the I/O buffer 3. Data from the data bus 14 is latched by the output data register 2 in response to an output data register write signal 11 output from the write pulse generator 1, and the latched data is set in response to the first write signal 12 for the input and output control register 4. Data is output in accordance with the operation mode of the I/O buffer 3 which remains unchanged by the malfunction state of the microcomputer 880 or internal noise of the microcomputer 880.

In the above discussion, the write pulse generator 1 generates the pulse signal. The write pulse generator 1 may output a state varying signal. If the write protection circuit 10 is designed to generate a pulse signal in response to only a first write signal 12 for the input and output control register 4 from the write pulse generator 1, a first write only is performed onto the input and output control register 4. The operation mode control circuit 20 thus maintains the first operation mode setting value from the initialization process.

The operation of the write protection circuit 10 will now be discussed with reference to FIG. 7.

The FF 6 is reset in response to the input of a reset signal 15 at an R terminal thereof, and then outputs a signal having a logical value of "0" from a Q terminal thereof. The reset signal 15 refers to a reset signal that resets a system containing the operation mode control circuit 20 or the entire circuit of the microcomputer 880. As a result, the buffer 7 outputs a signal having a logical value of "1". With the output signal "1" receiving from the buffer 7 at one input terminal, the AND gate 5 allows a signal received at the other input terminal to pass therethrough to the output terminal thereof.

The write signal 12 for the input and output control register 4, which is a pulse signal, is input to the other input terminal of the AND gate 5, and a pulse signal is output from the AND gate 5 to a CK terminal of the FF 6. Since a power supply voltage Vcc 9, namely, a signal having a logical value of "1" is always input to a D terminal of the FF 6, the FF 6 outputs a signal "1" at a Q terminal thereof. The output of the AND gate 5 is also transferred to the input and output control register 4 as a write protection signal. The input and output control register 4 captures the data from the data bus 14 and latches the data.

The output "1" at the Q terminal of the FF 6 is input to the buffer 7, which inverts the input into an output signal "0". The output of the buffer 7 is then input to the one input terminal of the AND gate 5, thereby blocking the second and subsequent input and output control register write signals 12. The output states of the buffer 7, the AND gate 5, and the FF 6 are maintained until a next reset signal 15 arrives. The second and subsequent input and output control register write signals 12 have no effect on the input and output control register 4.

More specifically, although the write protection circuit 10 generates a pulse signal in response to the write signal 12 for the input and output control register 4, the write signal 12 for the input and output control register 4 causes the FF 6 and the buffer 7 to latch the respective outputs thereof. The write protection circuit 10 thus disables the generation of a next pulse.

In accordance with the third preferred embodiment having the write protection circuit 10 and the operation mode control circuit 20 shown in FIG. 6, the write protection circuit 10 causes the input and output control register 4 to maintain the value, which is set in response to the first write signal 12 for the input and output control register 4, even under a malfunction state of the microcomputer 880 or the presence of internal noise of the microcomputer 880. The operation mode is thus free from rewriting as a result of an unintended software command.

The setting of the operation mode of the I/O buffer 3 has been discussed. If the input and output control register 4 is an operation mode control register, and the write signal 12 for the input and output control register 4 is an operation mode control register write signal, the operation mode control circuit 20 and the write protection circuit 10 control an ordinary operation mode, and provide the same advantage as the previously discussed embodiments.

Fourth Preferred Embodiment

A fourth preferred embodiment will now be discussed with reference to FIGS. 8 and 9. The fourth preferred embodiment relates to the operation mode control circuit in the second preferred embodiment of the present invention.

Figure 8:
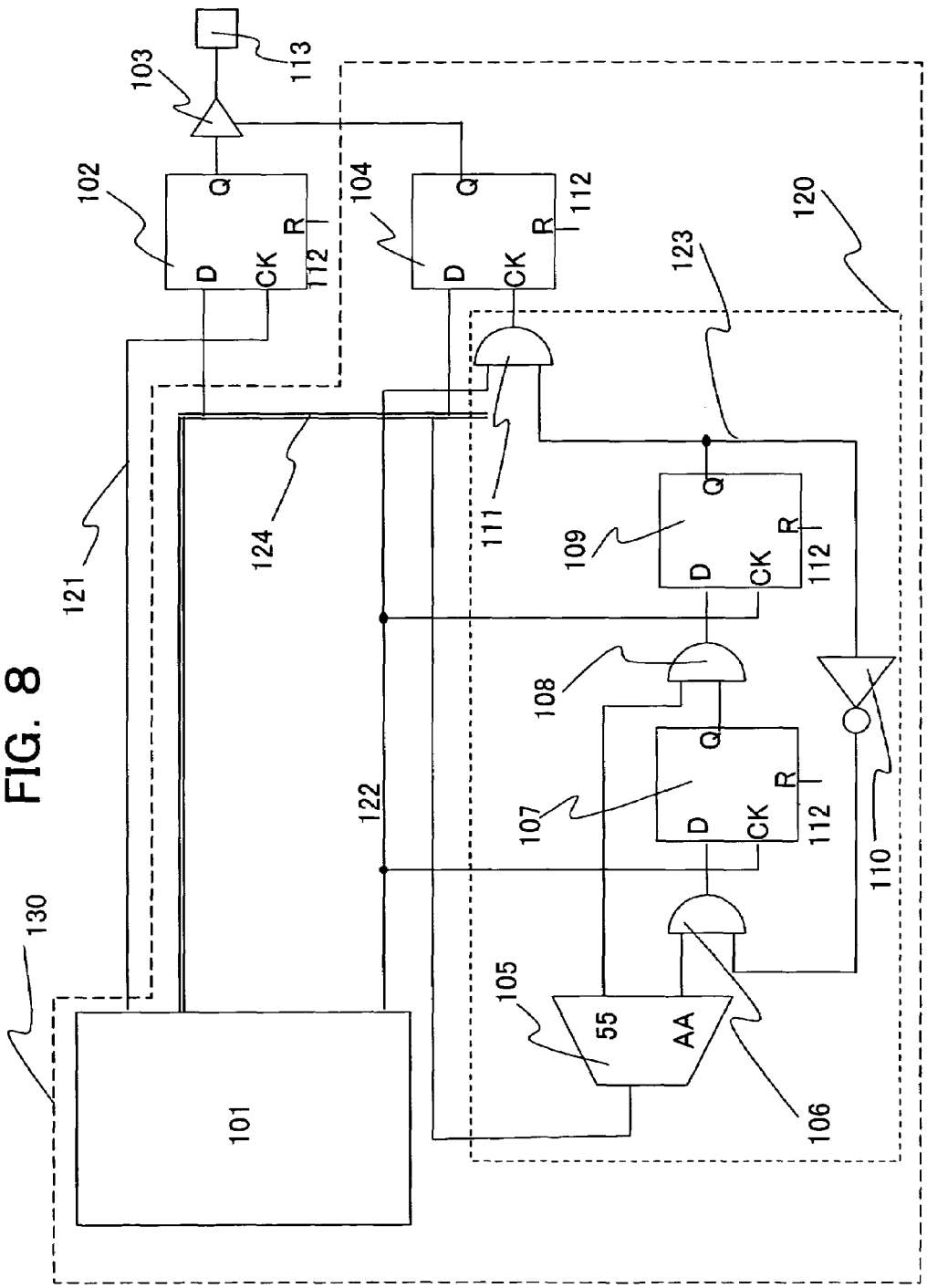
FIG. 8 illustrates a fourth preferred embodiment of the present invention.
Figure 9:
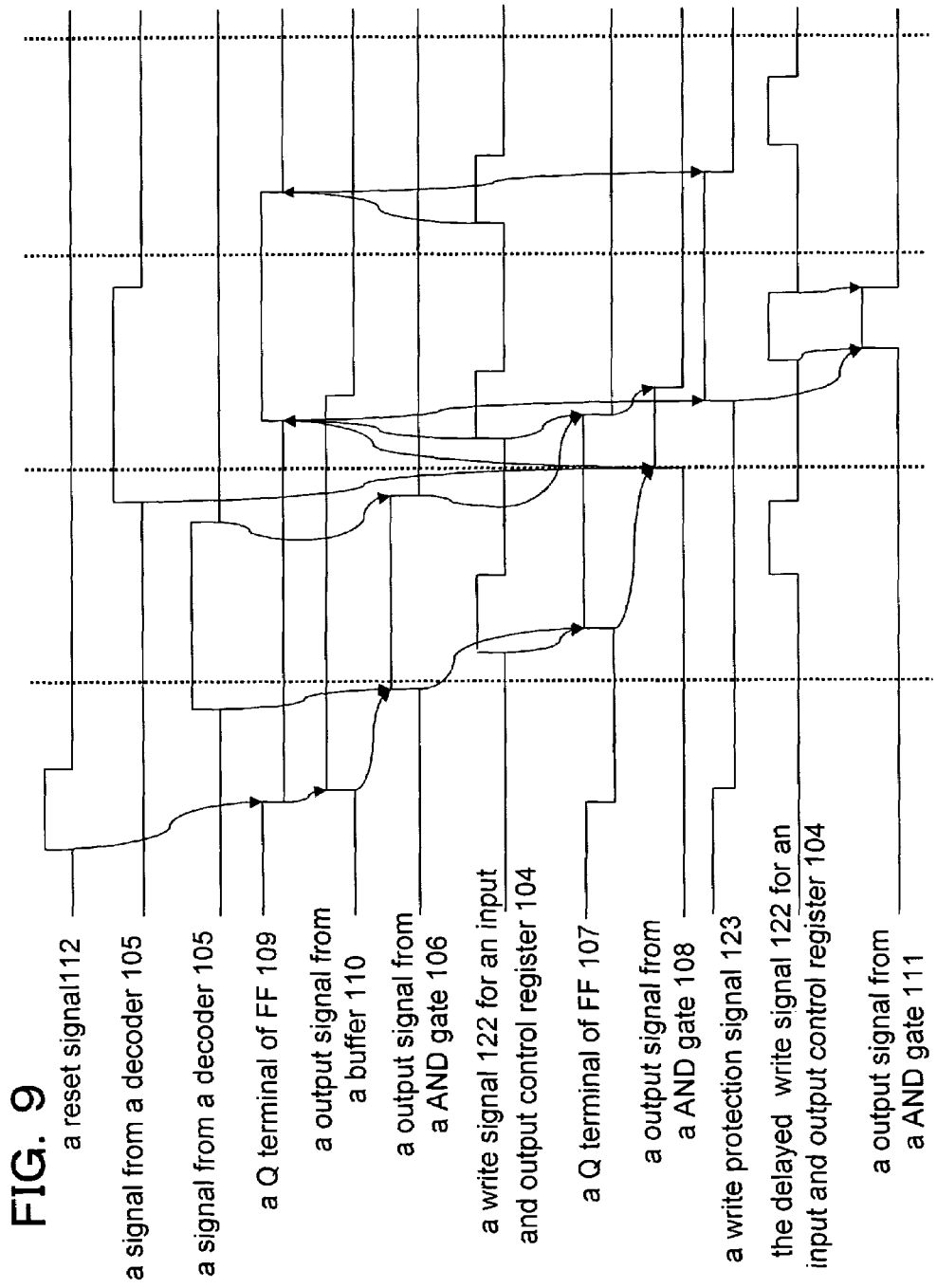
FIG. 9 is a waveform diagram of a write protection circuit of the fourth preferred embodiment of the present invention.

FIG. 8 shows an operation mode control circuit 130 containing a write protection circuit 120, an output data register 102 and an I/O buffer 103, both controlled by an operation mode control circuit 130, and a terminal 113 for outputting a signal from the I/O buffer 103. The output data register 102 and the I/O buffer 103 are respectively identical in function to the output data register 2 and the I/O buffer 3 of the third preferred embodiment of FIG. 6.

In accordance with the third preferred embodiment of FIG. 6, the write protection circuit 10 permits the operation mode setting value of the I/O buffer 3 to be written onto the input and output control register 4 for one time only subsequent to the initialization process. In accordance with the fourth preferred embodiment of FIG. 8, the write protection circuit 120 permits the setting value of the operation mode of the I/O buffer 103 to be written onto an input and output control register 104 if two or more decode signals are successively received from a write pulse generator 101.

The operation mode control circuit 130 includes a write pulse generator 101, the write protection circuit 120 that generates a pulse signal in response to the input of a write signal 122 for the input and output control register 104 from the write pulse generator 101, and an input and output control register 104 that latches data from a data bus 124 in response to the pulse signal from the write protection circuit 120. The write pulse generator 101 supplies the output data thereof to the output data register 102 through the data bus 124, and supplies an output data register write signal 121 to the output data register 102 to cause the output data register 102 to latch the output data thereof. The output at a terminal Q of the input and output control register 104 is fed to the I/O buffer 103, and the operation mode of the I/O buffer 103 is determined depending on the logical value of the output at the Q terminal of the input and output control register 104.

The write protection circuit 120 includes a decoder 105 that generates a decode signal corresponding to data "55" from the data bus 124 or data "AA" depending on whether the data "55" or the data "AA" is received, an AND gate 106 for receiving the decode signal corresponding to the data "AA" at one of input terminals thereof, a flip-flop (FF) 107 for capturing an output from the AND gate 106 in response to a write signal 122 for the input and output control register 104, an AND gate 108 for receiving an output from the FF 107 and the decode signal corresponding to the data "55", an FF 109 for capturing an output from the AND gate 108 in response to the write signal 122 for the input and output control register 104, an buffer 110 that receives an output from the FF 109 and outputs the signal thereof to one of the input terminals of the AND gate 106, and an AND gate 111 that receives a write protection signal 123, which is the output of the FF 109, at one of input terminals, and the write signal 122 for the input and output control register 104 at the other of the input terminals.

The data "55" and the data "AA" are successively decoded through the decoder 105, the write signal 122 for the input and output control register 104 is received from the write pulse generator 101, the write protection signal 123 is generated as a passage enable signal to the AND gate 111, and the AND gate 111 outputs, to the input and output control register 104, and the signal that is a buffered version of the write signal 122 for the input and output control register 104. As a result, a value corresponding to the operation mode of the I/O buffer 103 is set in the input and output control register 104.

With the decoding of the data "55" and the data "AA" being complete, the write protection signal 123 as a passage disable signal for the AND gate 111 is generated when the write protection circuit 120 receives the write signal 122 for the input and output control register 104. The write signal 122 for the input and output control register 104 is thus prevented from being transferred to the input and output control register 104. As a result, the operation mode control circuit 130 maintains a first operation mode setting value subsequent to the initialization process.

In the above discussion, the write signal 122 for the input and output control register 104 is a pulse signal. The write protection circuit 120 is designed to generate a pulse signal in response to the write signal 122 for the input and output control register 104 output from the write pulse generator 101 as long as a plurality of decode signals (here, the data "55" and the data "AA") is successively input. In such a case, the operation mode is also written onto the input and output control register 104, and the operation mode control circuit 130 equally maintains the operation mode setting value.

The output data register write signal 121, output from the write pulse generator 101 and latched by the output data register 102, is successively decoded by the write protection circuit 120, and is then output from the I/O buffer 103 in accordance with the operation mode set by the write signal 122 for the input and output control register 104.

Even if the microcomputer malfunctions, the possibility that successive decoding of particular data takes place is low. The operation mode set by the write signal 122 for the input and output control register 104 is not updated regardless of the malfunction of the microcomputer.

The operation of the write protection circuit 120 is further discussed in detail with reference to FIG. 9.

A reset signal 112 resets the FF 107 and the FF 109, thereby causing each FF to output a signal having a logical value of "0" at the output terminal Q thereof. In response to the data "AA", the decoder 105 generates the signal "1" responsive to the data "AA". Upon receiving the output signal "1" from the buffer 110 and the signal "1" responsive to the data "AA", the AND gate 106 outputs a signal "1". The FF 107 latches the output "1" of the AND gate 106 in response to the write signal 122 for the input and output control register 104 as a pulse signal and outputs a signal "1" at the Q terminal thereof.

When the decoding of the data "AA" ends, and the decoder 105 receives the data "55", the AND gate 108 receives the output "1" of the FF 107 and the signal "1" responsive to the data "55", and then outputs a signal "1". The FF 109 captures the output "1" of the AND gate 108 in response to the write signal 122 for the input and output control register 104, and outputs a signal "1" as the write protection signal 123. The AND gate 111 buffers the write signal 122 for the input and output control register 104 and outputs the buffered version of the write signal 122 for the input and output control register 104 to the input and output control register 104. The input and output control register 104 latches the data from the data bus 124.

If the decoding of the data "55" also ends, the decoder 105 outputs a signal "0". If the write pulse generator 101 outputs the write signal 122 for the input and output control register 104 in this state, the FF 109 outputs a signal "0" as the write protection signal 123. Since the AND gate 111 receives the signal "0" as the write protection signal 123 at one of the input terminals thereof, the AND gate 111 does not output the write signal 122 for the input and output control register 104 in the buffered version thereof.

The write protection circuit 120 outputs the write signal 122 for the input and output control register 104 in the buffered version thereof to the input and output control register 104 only when the write protection circuit 120 receives different decode signals for decoding. If the write protection circuit 120 fails to decode the data, or fails to successively decode the data, the write signal 122 for the input and output control register 104 in the buffered version thereof is not output to the input and output control register 104.

In accordance with the fourth preferred embodiment of the present invention employing the write protection circuit 120 and the operation mode control circuit 130, the possibility that the data "55" and the data "AA" are successively output is low even in the event of a computer malfunction. The operation mode set in the I/O buffer 103 during the successive decoding process is maintained. The operation mode is not updated regardless of an unintended software command, the write signal 122 for the input and output control register 104 arising from internal noise, and an output of a decode signal.

The setting of the operation mode of the I/O buffer 103 has been discussed. If the input and output control register 104 is an operation mode control register, and the write signal 122 for the input and output control register 104 is an operation mode control register write signal, the operation mode control circuit 130 and the write protection circuit 120 control an ordinary operation mode, and provide the same advantage as the previously discussed embodiments.

Fifth Preferred Embodiment

A fifth preferred embodiment of the present invention is now described with reference to FIGS. 10 and 11. The fifth preferred embodiment relates to the operation mode circuit of the first preferred embodiment of the present invention.

Figure 10:
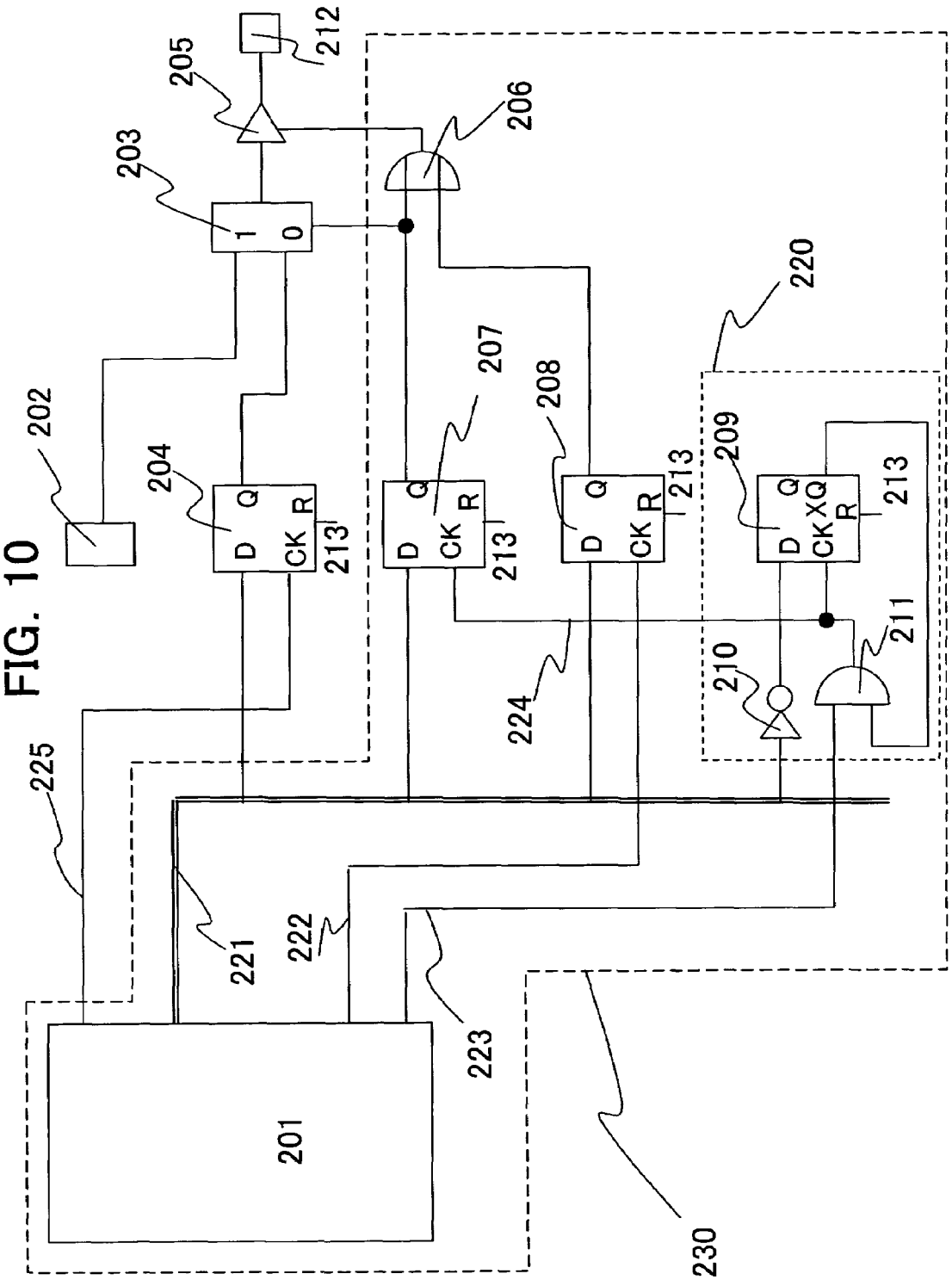
FIG. 10 illustrates a fifth preferred embodiment of the present invention.

FIG. 10 illustrates an operation mode control circuit 230 containing a write protection circuit 220, an output data register 204 and an I/O buffer 205, both controlled by the operation mode control circuit 230, a selector 203, a terminal 212 for providing an output from the I/O buffer 205, and a timer 202. The timer 202 outputs a clock signal with a constant period. The selector 203 selects between an output signal from the timer 202 and an output signal from the output data register 204. With a signal having a logical value of "1" set, the selector 203 selects the output signal from the timer 202. With a signal having a logical value of "0" set, the selector 203 selects the output from the output data register 204. The output data register 204 receives output data from the write pulse generator 201 through a data bus 221, and latches the received data.

In accordance with the third preferred embodiment of FIG. 6, the write protection circuit 10 permits the input and output control register 4 to be written with the operation mode setting value of the I/O buffer 3 for one time only subsequent to the initialization process. In accordance with the fifth preferred embodiment of FIG. 10, the writing of a selection setting value of a peripheral selection register 207 for use in the selector 203 is permitted from the initialization process to when a predetermined data signal is sent to and then latched by the write protection circuit 220.

The operation mode control circuit 230 includes the write pulse generator 201, the write protection circuit 220 that generates a write protection signal 224 in response to a write signal 223 for the peripheral selection register 207 from the write pulse generator 201, an input and output control register 208 that latches data on the data bus 221 in response to an input and output control register write signal 222 from the write pulse generator 201, the peripheral selection register 207 that latches data on the data bus 221 in response to a write protection signal 224 from the write protection circuit 220, and an OR gate 206 that receives and OR gates an output at a Q terminal of the input and output control register 208 and an output at a Q terminal of the peripheral selection register 207.

The output at the Q terminal of the peripheral selection register 207 is also fed to the selector 203, thereby serving as a selection signal. If the selection signal has a logical value of "1", the selector 203 selects a signal from the timer 202. Since the OR gate 206 provides an output signal having the same logical value as the selection signal, the I/O buffer 205 operates in an operation mode corresponding to the logical value of "1". If the selection signal has a logical value of "0", the selector 203 selects a signal from the output data register 204. The OR gate 206 outputs a signal having the same logical value as the output from the Q terminal of the input and output control register 208. The I/O buffer 205 operates in an operation mode corresponding to the output at the Q terminal of the input and output control register 208.

The write protection circuit 220 includes a buffer 210 for receiving data from the data bus 221, a flip-flop (FF) 209 that latches an output from the buffer 210 in response to the write signal 223 for the peripheral selection register 207 from the write pulse generator 201, and an AND gate 211 that receives the write signal 223 for the peripheral selection register 207 from the write pulse generator 201 and an output signal from the FF 209. The data bus 221 conducts, at least, a signal to the output data register 204, a signal to the peripheral selection register 207, a signal to the input and output control register 208, and a signal to the FF 209.

With a reset signal 213 received at an R terminal, the FF 209 in the write protection circuit 220 outputs a signal "1" at an XQ terminal thereof. The signal of the data bus 221 directed to the operation mode control circuit 20 is set to "0". The FF 209 latches the signal "0" from the data bus 221 in response to the write signal 223 for the peripheral selection register 207. The AND gate 211 continuously directly outputs the write signal 223 for the peripheral selection register 207 as a write protection signal 224 for a period until the XQ terminal of the FF 209 is transitioned to "0" (hereinafter after this period is referred to as "open period of the AND gate 211"). In other words, during the period throughout which the signal of the data bus 221 directed to the FF 209 is set to "1", subsequent to the moment the reset signal transitions the XQ terminal of the FF 209 of the write protection circuit 220 to "1", the peripheral selection register 207 latches the signal of the data bus 221 for the peripheral selection register 207 in response to the write protection signal 224 each time the write signal 223 for the peripheral selection register 207 is generated. During the time other than the open period of the AND gate 211, the XQ terminal of the FF 209 is set to "0". As a result, the write protection signal 224, which is the output of the AND gate 211, becomes a fixed signal having a logical value of "0", thereby preventing the peripheral selection register 207 from latching the signal of the data bus 221 for the peripheral selection register 207.

Figure 11:
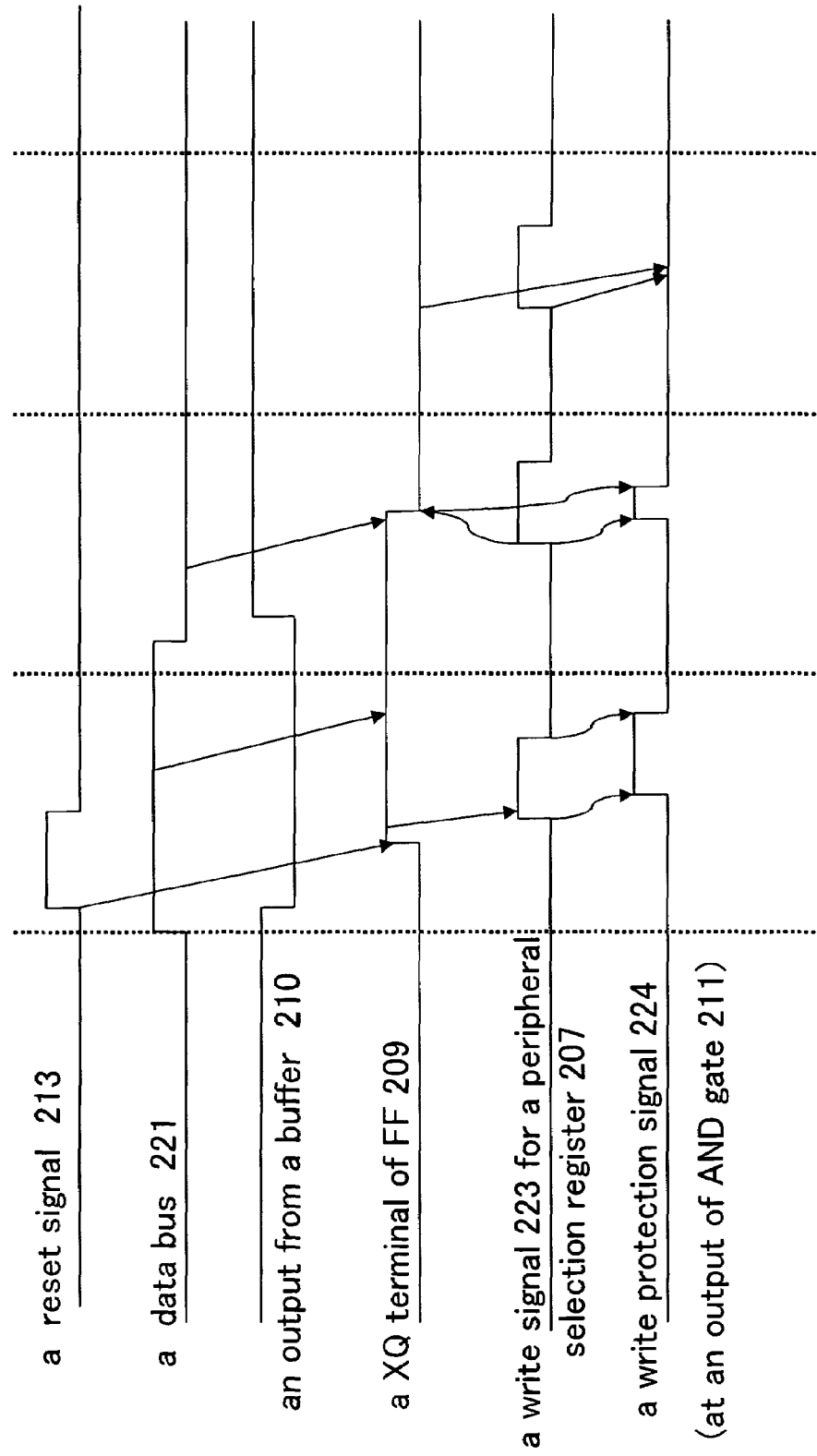
FIG. 11 is a waveform diagram of the write protection circuit of the fifth preferred embodiment of the present invention.

The operation of the write protection circuit 220 is discussed more in detail with reference to FIG. 11.

With the reset signal 213 received at the R terminal, the FF 209 is reset, thereby outputting a signal "1" at the XQ output terminal thereof. When the write pulse generator 201 generates the write signal 223 for the peripheral selection register 207, the AND gate 211 directly outputs the write signal 223 for the peripheral selection register 207 as the write protection signal 224. The FF 209 receives the write protection signal 224, thereby latching the signal of the data bus 221 for the FF 209.

If the data signal of the data bus 221 directed to the FF 209 is set to "1", the FF 209 maintains the output signal at the terminal XQ at "1". The AND gate 211 therefore allows a next write signal 223 for the peripheral selection register 207 to pass therethrough as the write protection signal 224.

If the data signal of the data bus 221 directed to the FF 209 is set to "0", the output signal at the XQ terminal of the FF 209 is transitioned to "0". As a result, the AND gate 211 outputs a signal fixed to "0" as the write protection signal 224. The peripheral selection register 207 and the FF 209 are protected from signal writing.

With the output at the XQ terminal of the FF 209 at "0", the AND gate 211 maintains the output thereof at "0". As long as the FF 209 is prevented from being reset by the reset signal 213, the peripheral selection register 207 and the FF 209 are continuously protected.

In the above discussion, the write signal 223 for the peripheral selection register 207 is a pulse signal. Even if the write signal 223 for the peripheral selection register 207 is a state variable signal, the write protection circuit 220 creates a pulse signal in response to the write signal 223 for the peripheral selection register 207 from the write pulse generator 201. The same advantage is also provided in this arrangement. To generate a pulse signal, a circuit for generating a pulse signal in response to the state variable signal is preferably arranged immediately subsequent to the AND gate 211 in the write protection circuit 220.

In the operation mode control circuit 230, the setting value of the peripheral selection register 207 is set to be the input to the selector 203, and the value of the input and output control register 208 set in response to the write protection signal 224 is set to be the input to the I/O buffer 205. Once the write protection circuit 220 protects the peripheral selection register 207 from the writing signal, the above-mentioned output signals are fixed.

If the output of the peripheral selection register 207 is "0", the selector 203 causes the output of the output data register 204, rather than the output of the timer 202, to be output from the I/O buffer 205 in accordance with the operation mode set according to the setting value of the input and output control register 208.

Since the output of the AND gate 211 is fixed to "0", the setting value of the peripheral selection register 207 is maintained regardless of a malfunction state of the microcomputer or presence of internal noise of the microcomputer. The signal from the timer 202 is not output, while the signal from the output data register 204 is continuously output.

The setting of the operation mode of the I/O buffer 205 has been discussed. If the input and output control register 208 is an operation mode control register, and the input and output control register write signal 222 is an operation mode control register write signal, the operation mode control circuit 230 and the write protection circuit 220 control an ordinary operation mode, and provide the same advantage as the previously discussed embodiments.

Sixth Preferred Embodiment

A sixth preferred embodiment of the present invention is discussed below with reference to FIGS. 12 and 13. The six preferred embodiment relates to the operation mode control circuit of the second preferred embodiment.

Figure 12:
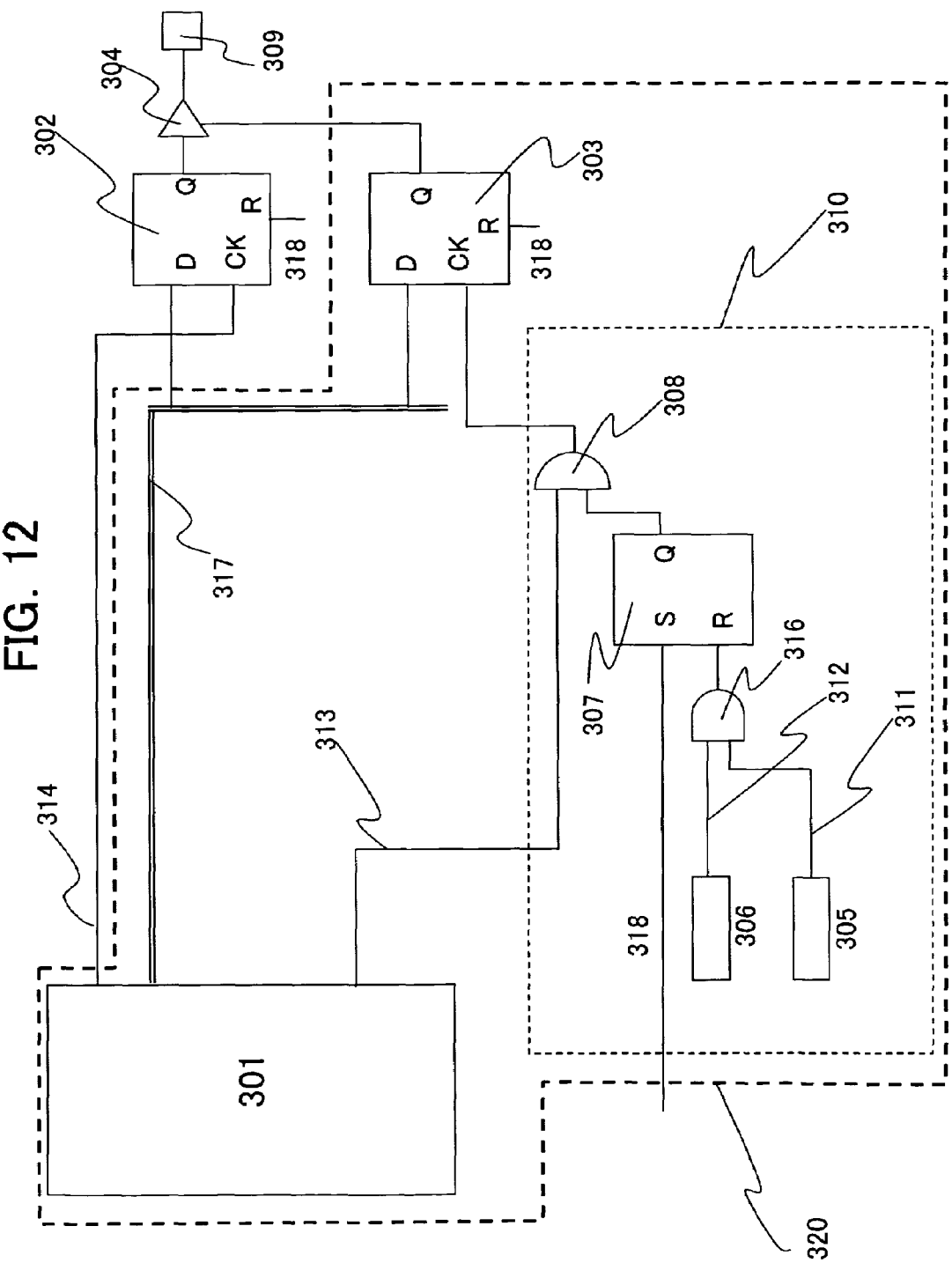
FIG. 12 generally illustrates a sixth preferred embodiment of the present invention.
Figure 13:
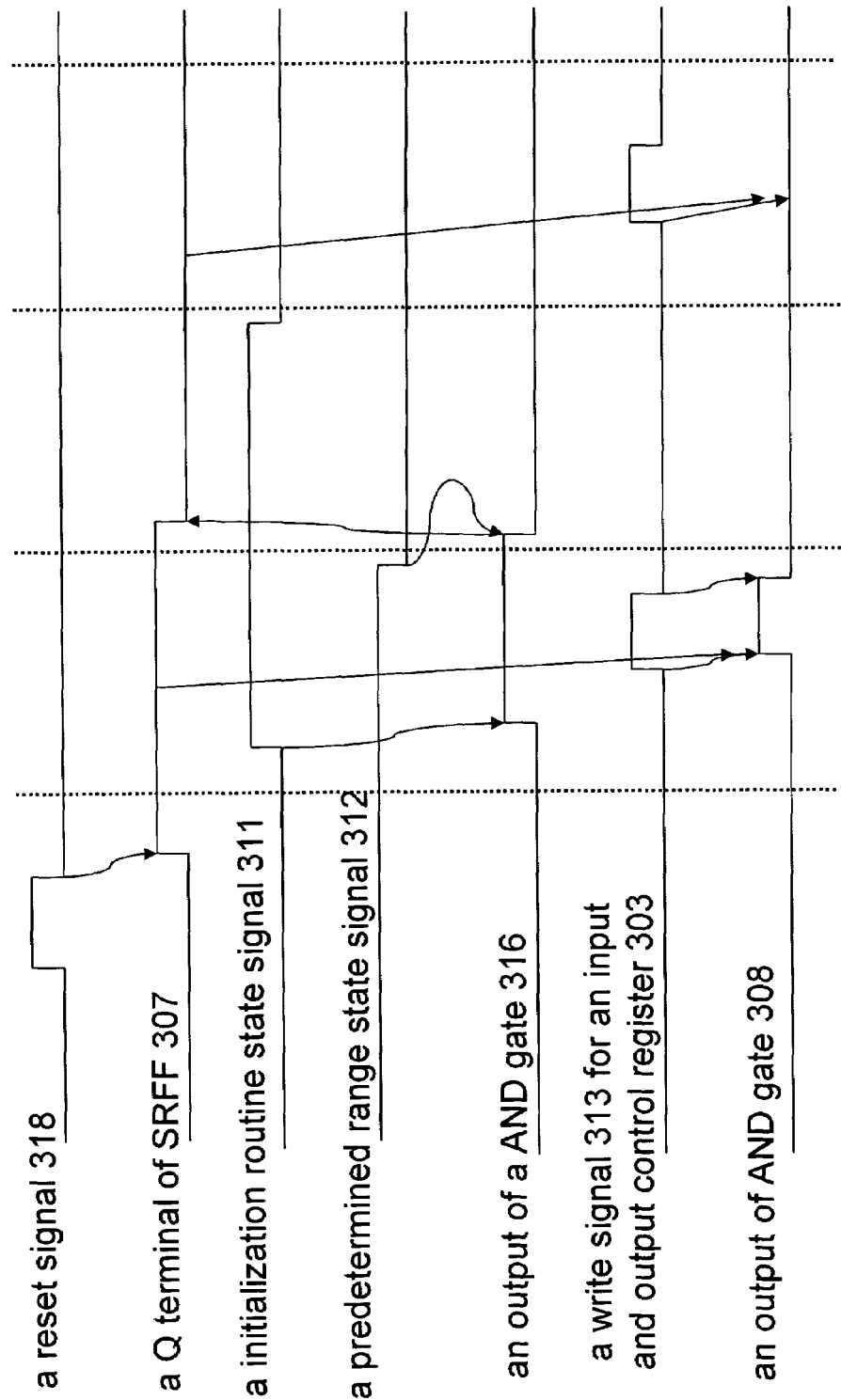
FIG. 13 is a waveform diagram of a write protection circuit of the sixth preferred embodiment of the present invention.

FIG. 12 illustrates an operation mode control circuit 320 containing a write protection circuit 310, an output data register 302 and an I/O buffer 304, both controlled by the operation mode control circuit 320, and a terminal 309 for providing an output signal from the I/O buffer 304. The output data register 302 and the I/O buffer 304 are respectively identical in function to the output data register 2 and the I/O buffer 3 of the third preferred embodiment of FIG. 6.

The third preferred embodiment of FIG. 6 allows the write protection circuit 10 to write the operation mode of the I/O buffer 3 to the input and output control register 4 for one time only subsequent to the initialization process. In contrast, the sixth preferred embodiment of the present invention allows the write protection circuit 310 to write the setting value of the operation mode of the I/O buffer 304 to the input and output control register 303 within a period throughout which a predetermined initialization routine is in progress.

The operation mode control circuit 320 includes a write pulse generator 301, a write protection circuit 310 that determines, based on the state of progress of an initialization program, whether or not to output a write signal 313 for the input and output control register 303 as a buffer in response to the input of the write signal 313 for the input and output control register 303 from the write pulse generator 301, and an input and output control register 303 that latches data from a data bus 317 in response to the buffer signal that is a buffered version of the write signal 313 for the input and output control register 303.

The write protection circuit 310 of the sixth preferred embodiment includes an initialization routine execution display circuit (hereinafter simply referred to as a display circuit) 305 for generating an initialization routine state signal 311 representing that the reading of the initialization program is in progress, a determination circuit 306, which determines the progress state of the initialization routine, for generating a predetermined range state signal 312 indicating that the sequence of the initialization program currently in progress is after a predetermined phase, an AND gate 316 for receiving the predetermined range state signal 312 and the initialization routine state signal 311, a set and reset flip-flop (hereinafter SRFF) 307 for latching an output of the AND gate 316, and an AND gate 308 that outputs a write protection signal in response to the write signal 313 for the input and output control register 303 received at one of input terminals thereof, and an output signal of the SRFF 307 received at the other of the input terminals thereof.

If the sequence of the initialization program currently in progress is before a predetermined phase, the write protection circuit 310 allows the write signal 313 for the input and output control register 303, output from the write pulse generator 301, to pass therethrough in the buffered version thereof. If the sequence of the initialization program currently in progress is after the predetermined phase, the write protection circuit 310 blocks the passage of the write signal 313 for the input and output control register 303.

In the operation mode control circuit 320, the write protection circuit 310 blocks the write signal 313 for the input and output control register 303 from the write pulse generator 301 subsequent to the predetermined phase of the initialization program. The setting value of the operation mode set in the input and output control register 303 is thus maintained even in the event of a malfunction of the microcomputer.

The I/O buffer 304 outputs the data captured by the output data register 302 in accordance with the operation mode set by the operation mode control circuit 320.

The operation of the operation mode control circuit 320 will now be discussed in detail with reference to FIG. 13.

In response to a reset signal 318, the SRFF 307 sets the output at an output terminal Q to "1". The reset signal 318 refers to a reset signal that resets a system including the operation mode control circuit 320 and the write protection circuit 310 or the entire circuit of the microcomputer.

When the initialization routine for initializing the microcomputer starts, the initialization routine execution display circuit 305 outputs the initialization routine state signal 311 having a logical value of "1". Initially, the determination circuit 306 outputs a predetermined range state signal 312 having a logical value of "1". As the initialization routine is in progress, and goes out of a predetermined range of the sequence, the determination circuit 306 outputs the predetermined range state signal 312 with the logical value transitioned to "0". Within a predetermined range of the initialization routine subsequent to the start of the initialization routine, the AND gate 316 outputs a signal having a logical value of "1", but out of the predetermined range, the AND gate 316 outputs a signal "0".

If the output of the AND gate 316 is transitioned from "0" to "1", and then from "1" to "0", the SRFF 307 shifts the output at the output terminal Q from "1" to "0".

When the write pulse generator 301 outputs the write signal 313 for the input and output control register 303 within the predetermined range of the initialization routine subsequent to the start of the initialization routine, the write signal 313 for the input and output control register 303 is buffered by the AND gate 308, and is then output to the input and output control register 303.

When no initialization program is executed, or when the initialization routine is out of the predetermined range, the output at the output terminal of the SRFF 307 is at a logical value of "0". The write signal 313 for the input and output control register 303 is thus blocked by the output of the AND gate 308.

In the operation mode control circuit 320 and the write protection circuit 310, illustrated in FIG. 12, the operation mode is set in the input and output control register 303 in the operation mode control circuit 320 during the execution of a phase prior to the predetermined phase of the initialization routine of the initialization program. The write protection circuit 310 that is not controlled by software programs other than the initialization program disables the writing to the input and output control register 303. In this arrangement, the set operation mode is free from unintentional updating that could be attributed to a software program in the event of internal noise or malfunction of the microcomputer.

Seventh Preferred Embodiment

Figure 14:
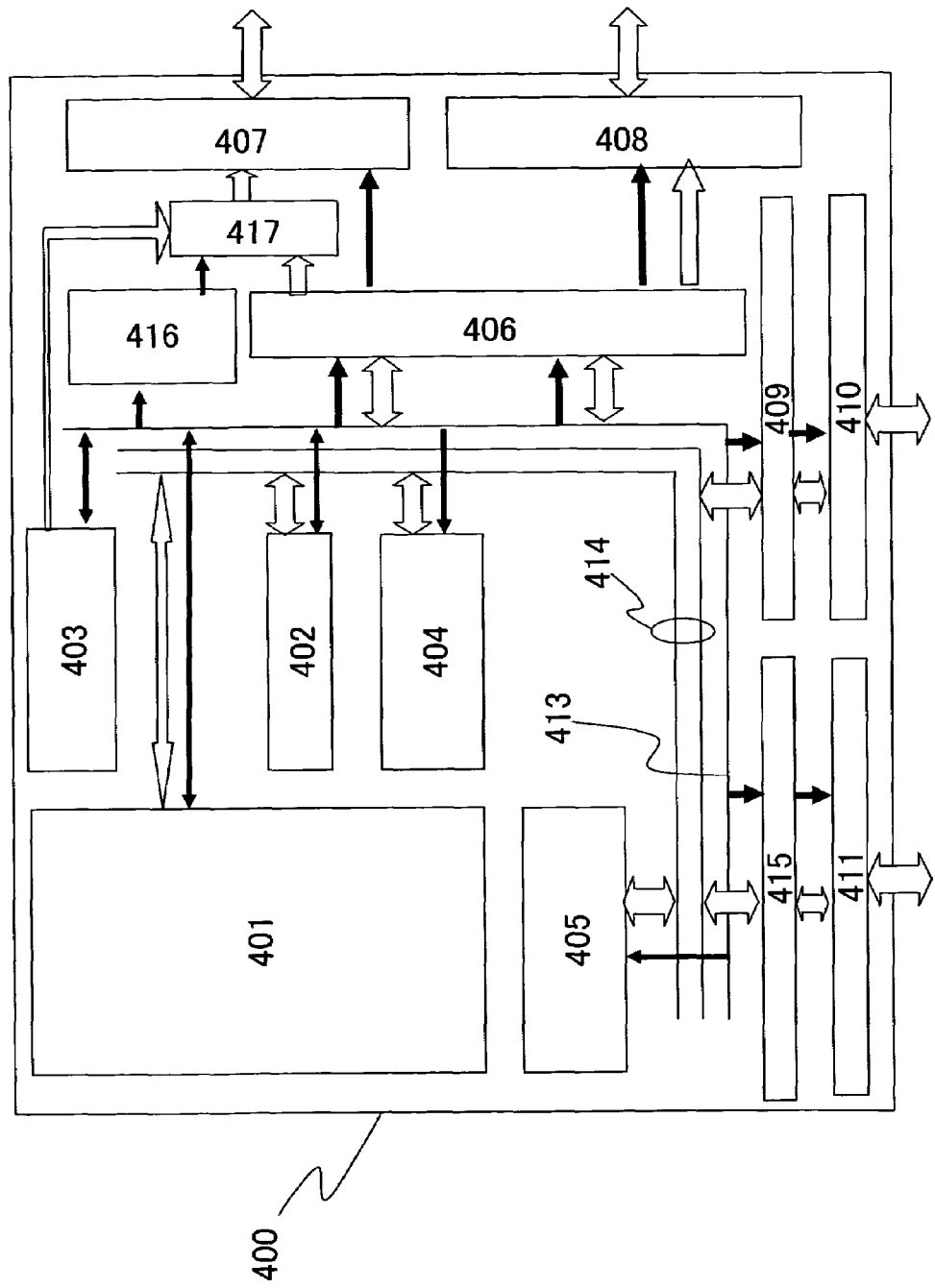
FIG. 14 generally illustrates a microcomputer in accordance with a seventh preferred embodiment of the present invention.

A seventh preferred embodiment of the present invention will now be discussed with reference to FIG. 14.

A microcomputer 400 of the seventh preferred embodiment includes a CPU 401, an ROM 405, an RAM 404, a timer 403, a write protection circuit 402, an input and output control register and address register 406 for address inputting and outputting, an input and output control register and address register 409 for address inputting and outputting, and an input and output control register and control signal register 415 for control signal inputting and outputting, a first address input and output unit 407, a second address input and output unit 408, a data input and output unit 410, a control signal input and output unit 411, a selector 417, control signal lines 413, data buses 414, and a peripheral selection register 416. The write protection circuit 402 is identical to the one used in the first through fourth preferred embodiments of the present invention. The write protection circuit 402, the input and output register, and the peripheral selection register constitute the operation mode control circuit in accordance with the third preferred embodiment of the present invention. The CPU 401 functions as the write pulse generator in the first through fourth preferred embodiments of the present invention.

The peripheral function such as of the timer 403 in the microcomputer 400 and input and output functions of registers for storing a control signal, data and addresses to be input from and output to outside the microcomputer 400 through the control signal lines 413 and the data buses 414, may be performed by an input and output unit that outputs data and signals to outside the microcomputer. For example, part of the first address input and output unit 407 functions as an output section of the timer 403.

The CPU 401 sends, to the input and output unit, a peripheral selection register write signal, namely, the setting value that represents the output of a particular function circuit, while sending data through the data bus. The CPU 401 thus sets the peripheral selection register write signal to the peripheral selection register 416. Furthermore, like in the peripheral selection register 416, the CPU 401 sets the input and output units as to what operation mode is to be performed by what input and output unit. The selector 417 selects a signal from one of a plurality of function circuits in accordance with a signal output in response to the setting value of the peripheral selection register 416. The input and output unit selects an output operation mode in response to the setting value of the input and output control register and address register 406.

The write protection circuit 402 prevents the peripheral selection register 416 and each input and output control register from being updated in setting value using the function as described in connection with the third through sixth preferred embodiments except for a predetermined setting method in response to a signal from the CPU.

In the microcomputer 400 of the seventh preferred embodiment, the write protection circuit 402, as is a monitoring signal to the watchdog, maintains the setting value of the control register determining an output attribute of an important input and output unit even in the event of a computer malfunction state. In normal operating conditions, the output attribute relating to the input and output unit remains unchanged regardless of a signal output from computer software command. Eve if a software command is in error, whether or not the microcomputer is in a malfunction state is reliably determined. If the microcomputer of the seventh preferred embodiment is employed in a system, a highly reliable system is provided.

Eighth Preferred Embodiment

Figure 15:
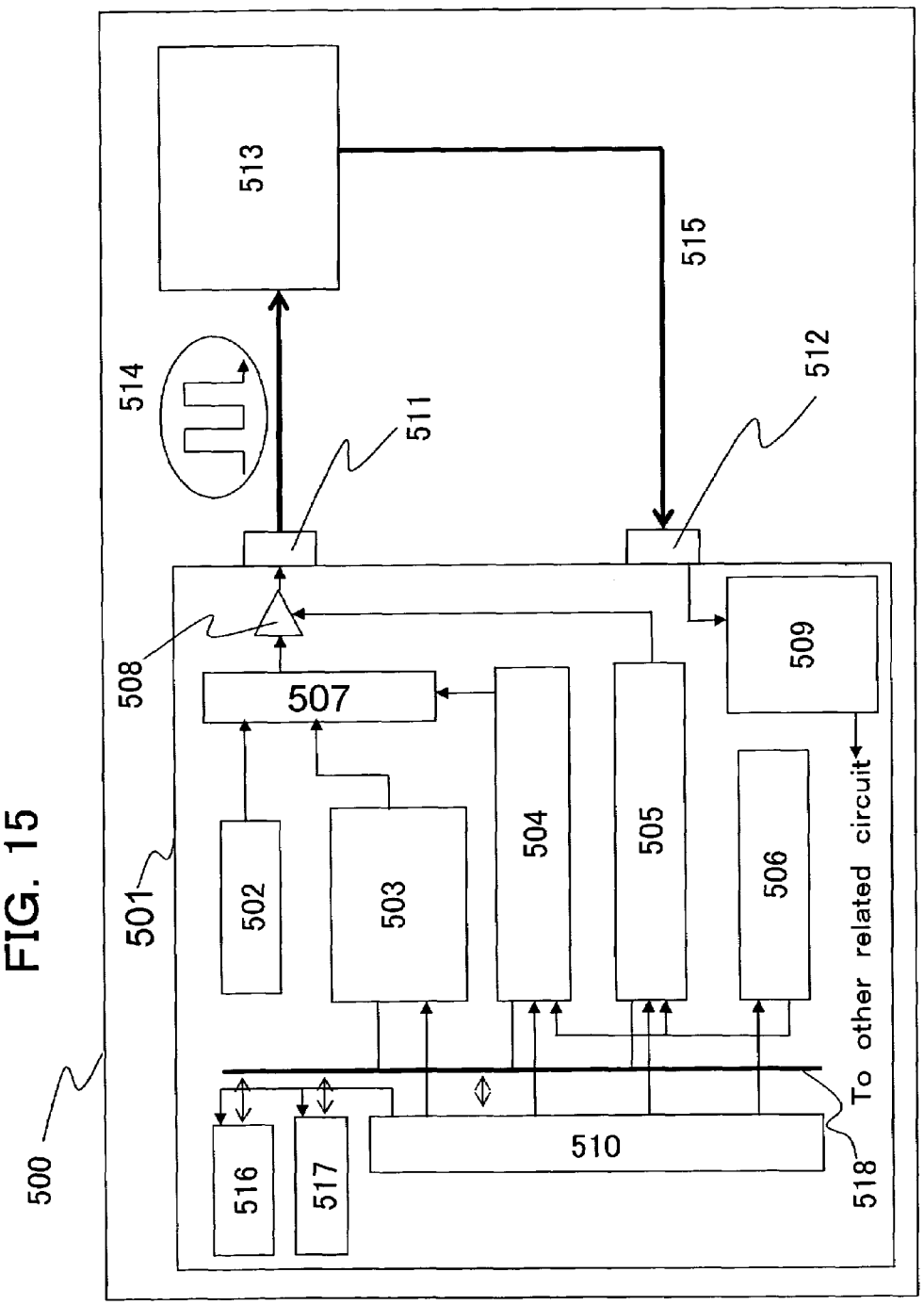
FIG. 15 generally illustrates a control system in accordance with an eighth preferred embodiment of the present invention.
Figure 16:
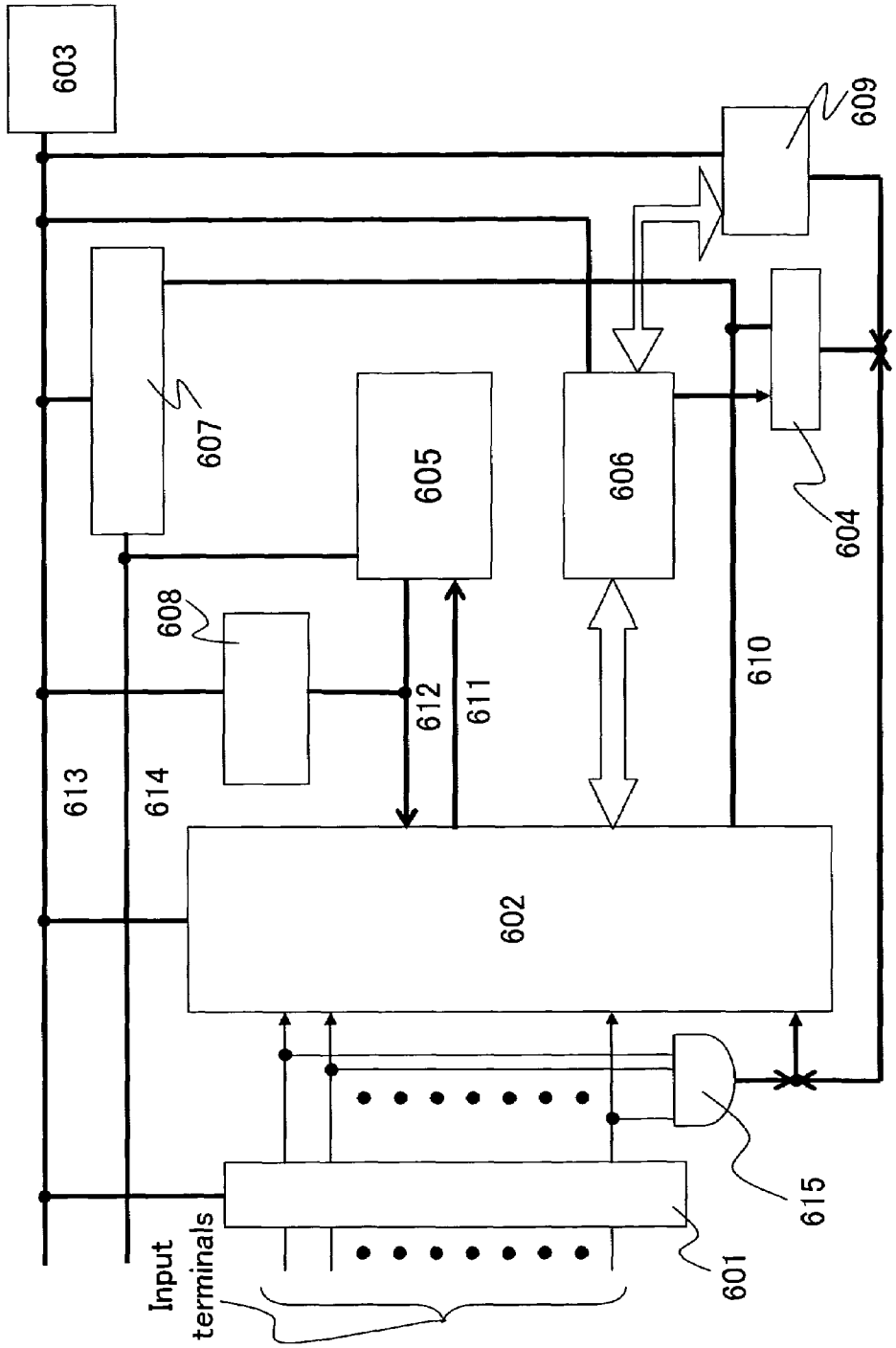
FIG. 16 diagrammatically illustrates a known onboard vehicular microcomputer system.
Figure 17:
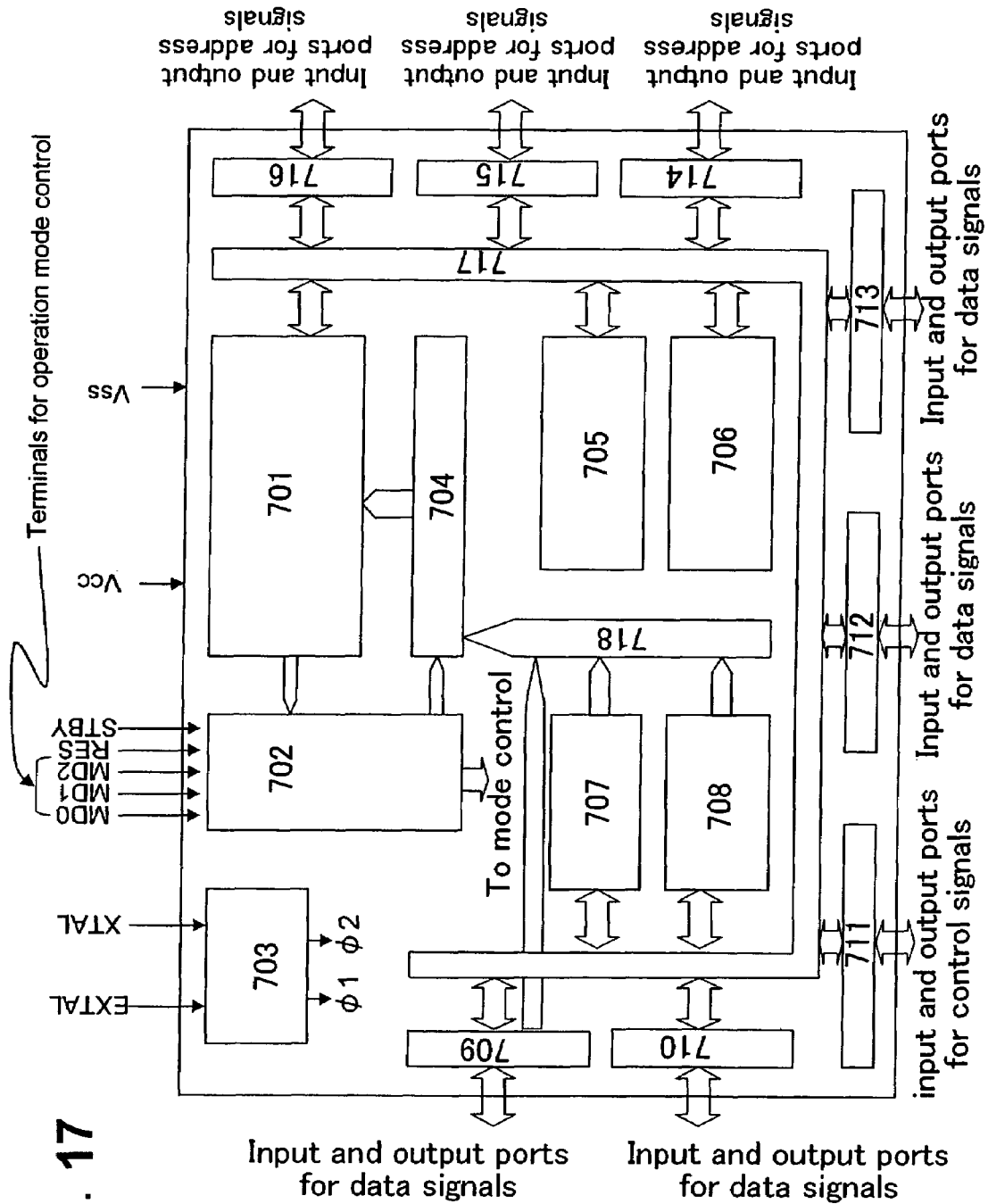
FIG. 17 diagrammatically illustrates a known data processing apparatus.
Figure 18:
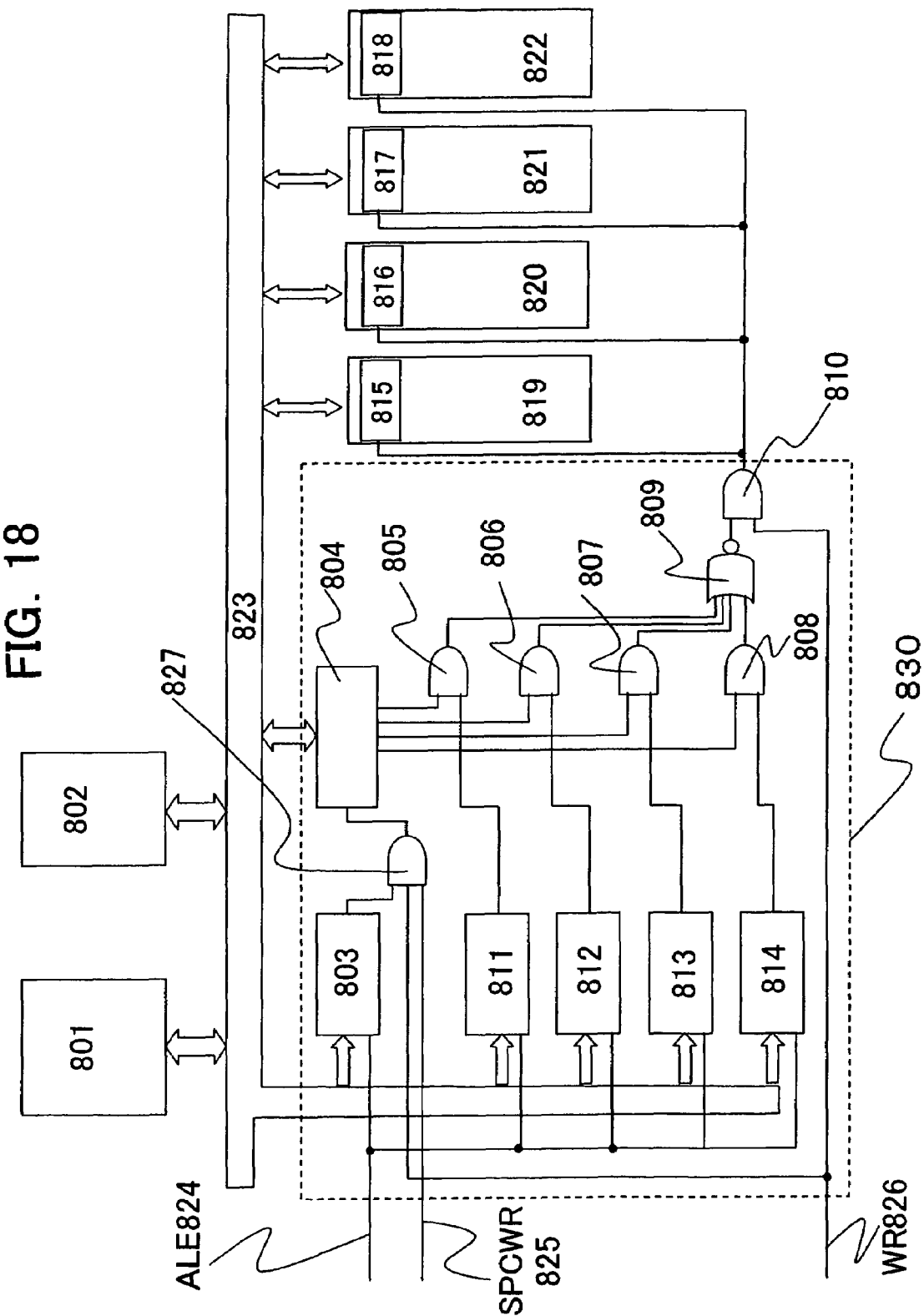
FIG. 18 diagrammatically illustrates a known microcomputer.

An eighth preferred embodiment of the present invention will now be discussed with reference to FIG. 15.

The control system 500 of the eighth preferred embodiment of the present invention includes, at least, a microcomputer 501 and a watchdog 513. The microcomputer 501 includes a peripheral function circuit such as a timer 502, an output data register 503 related to a monitoring signal, a selector 507 that selects between an output from the peripheral function circuit such as the timer 502 and an output from the output data register 503, an I/O buffer 508 for outputting an output of the selector 507, a monitoring signal output port 511 for outputting the monitoring signal, a peripheral,selection register 504 for controlling the selector 507, an input and output control register 505 for controlling the input and output mode of the I/O buffer 508, a write protection circuit 506 for protecting the peripheral selection register 504 or the input and output control register 505 from being data writing, a CPU 510, an RAM 516, an ROM 517, a reset circuit 509, and a reset signal receiving port 512 for receiving a reset signal for resetting the entire microcomputer. The watchdog 513 receives a monitoring signal 514 from the microcomputer 501 and generates a reset signal 515 at the moment the monitoring signal 514 is interrupted. The write protection circuit 506 is identical to the write protection circuit in each of the first through fourth preferred embodiments. The write protection circuit 506, the input and output control register 505, and the peripheral selection register 504 constitute the operation mode control circuit of the fifth preferred embodiment of the present invention.

The control system 500 of the eighth preferred embodiment may be incorporated in an apparatus to control it. If the microcomputer 501 in the control system 500 malfunctions for some reasons, the monitoring signal from the monitoring signal output port 511 is interrupted. The watchdog 513 detects the signal interruption, and then generates the reset signal 515 directed to the microcomputer 501. The microcomputer 501 is reset, thereby automatically being restored from the malfunction. When the control system 500 normally operates, the output attribute of the I/O buffer 508 of the microcomputer 501 remains unchanged regardless of a signal output in response to a software command of the microcomputer 501. Even if a software command from the monitoring signal output port of the watchdog is erroneous, the output from the output data register 503 for outputting the monitoring signal is not switched to the output of the timer 502. A determination is thus reliably made of whether or not the microcomputer 501 malfunctions. The apparatus incorporating the control system 500 in accordance with the eighth embodiment becomes a reliable apparatus.

What is claimed is:

1. An operation mode control circuit in a microcomputer, resettable by a reset signal from the outside, for performing processes under the control of a control program, the operation mode control circuit comprising:

a control signal generator for generating a first output signal, being output during a first subsequence for a reset of the microcomputer and for generating a second output signal for setting an operation mode of an input and output circuit;

a write protection circuit for generating a buffer signal in response to a first signal of the first output signal; and a control circuit for latching the a second output signal from the control signal generator in response to the buffer signal from the write protection circuit, wherein the control circuit sets an operation mode of an input and output circuit, which receives a signal from and sends a signal to the outside, in accordance with the latched second output signal, wherein the write protection circuit comprises:

buffer units for outputting a buffer signal that is a buffered version of a first signal of the first output signal and outputting a fixed logical value signal in response to the first output signal excluding the first signal of the first out put signal output from the control signal generator; and latch units for performing a latch process in response to the first output signal from the control signal generator and for outputting a status signal indicating a latch status thereof, wherein the buffer units has an input terminal for receiving the status signal from the latch units, and outputs the fixed logical value signal if the status signal indicates the latch status, or outputs the buffer signal if the status signal does not indicate the latch status.

2. An operation mode control circuit in a microcomputer, resettable by a reset signal from the outside, for performing processes under the control of a control program, the operation mode control circuit comprising:

a control signal generator for generating a first output signal, being output during a first subsequence for a reset of the microcomputer and for generating a second output signal for setting an operation mode of an input and output circuit;

a write protection circuit for generating a buffer signal in response to a first signal of the first output signal; and a control circuit for latching the a second output signal from the control signal generator in response to the buffer signal from the write protection circuit, wherein the control circuit sets an operation mode of an input and output circuit, which receives a signal from and sends a signal to the outside, in accordance with the latched second output signal, wherein the write protection circuit comprises:

an AND gate for receiving the first output signal from the control signal generator at one of input terminals thereof;

a flip-flop, with a reset terminal and a clock terminal thereof connected to an output terminal of the AND gate, for outputting a signal having a logical signal "0" when the reset signal is received at the reset terminal and for outputting a signal having a logical signal "1" when a pulse signal is received at the clock terminal thereof; and a buffer for outputting a logically inverted version of a signal from the flip-flop to the other of the input terminals of the AND gate, wherein the AND gate AND gates the first output signal from the control signal generator and the logically inverted version of the signal from the flip-flop.

3. An operation mode control circuit in a microcomputer for performing processes under the control of a control program, the operation mode control circuit comprising:

a control signal generator for generating a first output signal output during a first subsequence for a reset of the microcomputer, for generating a second output signal for setting an operation mode of an input and output circuit and for generating a first decode signal and a second decode signal;

a write protection circuit for generating a buffer signal that is a buffered version of a the first output signal from the control signal generator only if the first decode signal having predetermined data and the second decode signal having predetermined data have been successively received from the control signal generator; and a control circuit for latching a second signal from the control signal generator in response to the buffer signal from the write protection circuit, wherein the control circuit sets, in response to the second output signal latched, the operation mode of an input and output control circuit that receives a signal from and sends a signal to the outside, wherein the write protection circuit comprises:

a decoder for outputting a first selection status signal and a second selection status signal in response to the first decode signal and the second decode signal from the control signal generator, respectively;

a first AND gate for receiving the first selection status signal at one of input terminals thereof, the first AND gate AND gating the first election status signal and the third output signal;

a second AND gate for receiving the second selection status signal at one of input terminals thereof, the second AND gate AND gating the second selection status signal and the first data;

a third AND gate for AND gating the second data and the first output signal;

a first flip-flop for latching an output signal from the first AND gate in response to the first output signal from the control signal generator and for outputting first data to the other of the input terminals of the second AND gate;

a second flip-flop for latching an output from the second AND gate in response to the first output signal from the control signal generator and for outputting second data to one of input terminals of the third AND gate; and a buffer for outputting, to the other of the input terminals of the first AND gate, a third output signal that is a logically inverted version of the second data, wherein the control circuit includes a third flip-flop that latches the second output signal from the control signal generator in response to an output signal from the third AND gate.

4. An operation mode control circuit, in a microcomputer, resettable by a reset signal from the outside, for performing processes under the control of a control program, the operation mode control circuit comprising:

a control signal generator;

a write protection circuit for latching a second output signal from the control signal generator in response to a first output signal from the control signal generator and generating a write signal responsive to a logical value of the second output signal latched in the write protection circuit;

a first control circuit for latching a third output signal from the control signal generator in response to the write signal and for generating a first control signal responsive to the a logical value of the third output signal latched in the first control circuit;

a second control circuit for latching a fifth output signal from the control signal generator in response to a fourth output signal from the control signal generator, and for generating a second control signal responsive to a logical value of the fifth output signal latched in the second control circuit;

an OR gate for OR gating the first control signal and the second control signal and outputting an OR gate output as an operation mode setting signal, wherein the write signal responsive to the logical value of the second output signal from the control signal generator is a signal with a fixed logical value if a logical value of the second output signal latched in the write protection circuit is "0", the write signal is a buffer signal that is a buffered version of the first output signal from the control signal generator if a logical value of the second output signal latched in the write protection circuit is "1", wherein the first control signal is supplied to a selection circuit that selects one signal generator from among a plurality of signal generators, each containing at least a data register, for sending a signal to the outside, and wherein the operation mode setting signal is supplied to a circuit, which controls signal inputting from and signal outputting to the outside, to set the operation mode of the circuit.

5. An operation mode control circuit in a microcomputer for performing processes under a control of a control program, the operation mode control circuit comprising:
a control signal generator;
a write protection circuit for latching a second output signal from the control signal generator in response to a first output signal from the control signal generator, and for generating a write signal responsive to a logical value of the second output signal latched in the write protection circuit; and
a control circuit for latching a third output signal from the control signal generator in response to the write signal and for generating a control signal responsive to a logical value of the third output signal latched in the control circuit,
wherein the write signal is a signal with a fixed logical value if the logical value of the second output signal latched in the write protection circuit is "0",
the write signal is a buffer signal that is the buffered version of the first output signal from the control signal generator if a logical value of the second output signal latched in the write protection circuit is "1", and the control signal is supplied to a selection circuit that selects one signal generator from among a plurality of signal generators, each containing at least a data register, for sending a signal to the outside,
wherein the write protection circuit comprises:
buffer units for outputting one of the buffer signal resulting from the first output signal and the signal having the fixed logical value in response to the first output signal from the control signal generator, and
latch units for latching the second output signal from the control signal generator in response to the buffer signal and outputting a logical signal responsive to the logical value of the second output signal,
wherein the buffer units receives the logical signal from the latch units, and outputs a signal with the logical value thereof fixed in response to one logical value of the logical signal while outputting the buffer signal in response to the other logical value of the logical signal.

6. An operation mode control circuit in a microcomputer for performing processes under a control of a control program, the operation mode control circuit comprising
a control signal generator;
a write protection circuit for latching a second output signal from the control signal generator in response to a first output signal from the control signal generator, and for generating a write signal responsive to a logical value of the second output signal latched in the write protection circuit; and
a control circuit for latching a third output signal from the control signal generator in response to the write signal and for generating a control signal responsive to a logical value of the third output signal latched in the control circuit,
wherein the write signal is a signal with a fixed logical value if the logical value of the second output signal latched in the write protection circuit is "0", the write signal is a buffer signal that is the buffered version of the first output signal from the control signal generator if a logical value of the second output signal latched in the write protection circuit is "1", and the control signal is supplied to a selection circuit that selects one signal generator from among a plurality of signal generators, each containing at least a data register, for sending a signal to the outside,
wherein the write protection circuit comprises:
an AND gate for receiving, at one of input terminals thereof the first output signal from the control signal generator;
a buffer for outputting a buffer signal that is an logically inverted version of the second output signal from the control signal generator; and
a latch for receiving the buffer signal at a data terminal thereof, for latching the buffer signal in response to an output from the AND gate, and for generating a logical signal responsive to the logical value of the buffer signal, wherein the AND gate AND gates the logical signal and the first output signal.

7. A microcomputer comprising:
an operation mode control circuit including
a control signal generator,
a write protection circuit for latching a second output signal from the control signal generator in response to a first output signal from the control signal generator and generating a write signal responsive to the logical value of the second signal latched by the write protection circuit, the write signal being a signal with a fixed logical value if a logical value of the second output signal latched in the write protection circuit is "0", the write signal being a buffer signal that is a buffered version of the first output signal if a logical value of the second output signal latched in the write protection circuit is "1",
a first control circuit for latching a third output signal from the control signal generator in response to the write signal and for generating a first control signal responsive to the logical value of the latched third output signal,
a second control circuit for latching a fifth output signal from the control signal generator in response to a fourth output signal from the control signal generator, and for generating a second control signal responsive to the logical value of the latched fifth output signal, and
an OR gate for OR gating the first control signal and the second control signal and outputting an OR gate output as an operation mode setting signal;
a signal input and output control circuit for controlling of signal inputting from and signal outputting to the outside
a data register for latching a data signal from the operation mode control circuit in response to a data register write signal from the operation mode control circuit;
a timer for generating a clock with at least one constant period; and
a selection circuit for selecting one of the data register and the timer in response to the first control signal from the operation mode control circuit,
wherein the data register outputs a signal responsive to the data signal to the signal input and output control circuit.

* * * * *